(12) United States Patent
Shepherd

(10) Patent No.: US 6,820,195 B1
(45) Date of Patent: Nov. 16, 2004

(54) ALIGNING LOAD/STORE DATA WITH BIG/LITTLE ENDIAN DETERMINED ROTATION DISTANCE CONTROL

(75) Inventor: David E. Shepherd, Bristol (GB)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/410,545

(22) Filed: Oct. 1, 1999

(51) Int. Cl.[7] .............................................. G06F 9/315
(52) U.S. Cl. ..................... 712/300; 711/201; 712/225
(58) Field of Search ........................ 711/201; 712/225, 712/300, 204, 201, 224

(56) References Cited

U.S. PATENT DOCUMENTS

| | | | | |
|---|---|---|---|---|
| 4,135,242 A | * | 1/1979 | Ward et al. ................. 712/245 |
| 4,149,263 A | * | 4/1979 | Prioste ........................ 377/69 |
| 4,495,598 A | * | 1/1985 | Vahlstrom et al. .......... 712/300 |
| 4,814,976 A | | 3/1989 | Hansen et al. |
| 4,814,981 A | | 3/1989 | Rubinfeld ................... 364/200 |
| 4,916,654 A | * | 4/1990 | Sherman et al. ............ 345/537 |
| 5,222,225 A | * | 6/1993 | Groves ........................ 710/22 |
| 5,251,311 A | | 10/1993 | Kasai .......................... 395/425 |
| 5,291,586 A | * | 3/1994 | Jen et al. ..................... 712/220 |
| 5,313,231 A | * | 5/1994 | Yin et al. .................... 345/605 |
| 5,386,531 A | * | 1/1995 | Blaner et al. ................ 711/201 |
| 5,386,565 A | | 1/1995 | Tanaka et al. ............... 395/700 |
| 5,423,010 A | * | 6/1995 | Mizukami .................... 341/60 |
| 5,423,050 A | | 6/1995 | Taylor et al. ................ 395/575 |
| 5,434,804 A | | 7/1995 | Bock et al. .................. 364/579 |
| 5,440,705 A | | 8/1995 | Wang et al. ............. 395/421.1 |
| 5,448,576 A | | 9/1995 | Russell ....................... 371/22.3 |
| 5,452,432 A | | 9/1995 | Macachor ................... 395/425 |
| 5,455,936 A | | 10/1995 | Maemura ................ 395/183.11 |
| 5,479,652 A | | 12/1995 | Dreyer et al. .......... 395/183.06 |
| 5,483,518 A | | 1/1996 | Whetsel ........................ 370/13 |
| 5,488,688 A | | 1/1996 | Gonzales et al. ......... 395/183.1 |
| 5,499,380 A | * | 3/1996 | Iwata et al. ................. 711/212 |
| 5,530,965 A | | 6/1996 | Kawasaki et al. ............ 712/38 |
| 5,570,375 A | | 10/1996 | Tsai et al. .................. 371/22.3 |
| 5,590,354 A | | 12/1996 | Klapproth et al. .......... 395/800 |

(List continued on next page.)

FOREIGN PATENT DOCUMENTS

| | | | |
|---|---|---|---|
| EP | 165 600 | 11/1991 | |
| EP | 636 976 | 2/1995 | |
| EP | 652 516 | 5/1995 | |
| EP | 702 239 | 3/1996 | |
| EP | 720 092 | 7/1996 | |
| EP | 933 926 | 8/1999 | |
| EP | 945 805 | 9/1999 | |
| EP | 959 411 | 11/1999 | |
| JP | 8320796 A | 12/1996 | ............. G06F/9/46 |
| JP | 8329687 A | 12/1996 | ............ G11C/15/00 |
| JP | 9212358 A | 8/1997 | ............. G06F/9/38 |
| JP | 9311786 A | 12/1997 | ............. G06F/9/38 |
| JP | 10106269 A | 4/1998 | ......... G11C/11/413 |
| JP | 10124484 A | 5/1998 | ........... G06F/17/10 |
| JP | 10177520 A | 6/1998 | ........... G06F/12/10 |
| WO | WO98/13759 | 4/1998 | |

OTHER PUBLICATIONS

Richard York; Real Time Debug for System–on–Chip Devices; Jun. 1999; pp. 1–6.

*Primary Examiner*—Kenneth S. Kim
(74) *Attorney, Agent, or Firm*—Townsend and Townsend and Crew LLP

(57) ABSTRACT

Embodiments of the present invention are directed to an architecture structured to handle unaligned memory references. In one embodiment, a method for loading unaligned data stored in a plurality of memory locations comprises loading a first part of the unaligned data into a first storage location; rotating and sign-extending the first part of the unaligned data in the first storage location from a first position to a second position; loading a second part of the unaligned data into a second storage location; rotating the second part of the unaligned data in the second storage location from a third position to a fourth position; and combining the first storage location with the second location using a logical operation into a result storage location.

11 Claims, 13 Drawing Sheets

U.S. PATENT DOCUMENTS

| | | | |
|---|---|---|---|
| 5,596,734 A | 1/1997 | Ferra | 395/825 |
| 5,598,551 A | 1/1997 | Barajas et al. | 395/484 |
| 5,608,881 A | 3/1997 | Masumura et al. | 710/310 |
| 5,613,153 A | 3/1997 | Arimilli et al. | 395/821 |
| 5,627,842 A | 5/1997 | Brown et al. | 371/22.3 |
| 5,655,065 A * | 8/1997 | Robertson et al. | 711/202 |
| 5,657,273 A | 8/1997 | Ayukawa et al. | 365/189.01 |
| 5,682,545 A | 10/1997 | Kawasaki et al. | 712/41 |
| 5,704,034 A | 12/1997 | Circello | 395/183.14 |
| 5,708,773 A | 1/1998 | Jeppesen, III et al. | 395/183.06 |
| 5,724,549 A | 3/1998 | Selgas et al. | 395/468 |
| 5,737,516 A | 4/1998 | Circello et al. | 395/183.14 |
| 5,751,621 A | 5/1998 | Arakawa | 708/501 |
| 5,768,152 A | 6/1998 | Battaline et al. | 364/551.01 |
| 5,771,240 A | 6/1998 | Tobin et al. | 371/22.1 |
| 5,774,701 A | 6/1998 | Matsui et al. | 713/501 |
| 5,778,237 A | 7/1998 | Yamamoto et al. | 713/322 |
| 5,781,558 A | 7/1998 | Inglis et al. | 371/21.1 |
| 5,796,978 A | 8/1998 | Yoshioka et al. | 711/206 |
| 5,828,825 A | 10/1998 | Eskandari et al. | 395/183.03 |
| 5,832,248 A | 11/1998 | Kishi et al. | 712/200 |
| 5,835,963 A | 11/1998 | Yoshioka et al. | 711/207 |
| 5,848,247 A | 12/1998 | Matsui et al. | 710/104 |
| 5,860,127 A | 1/1999 | Shimazaki et al. | 711/167 |
| 5,862,387 A | 1/1999 | Songer et al. | 395/728 |
| 5,867,726 A | 2/1999 | Ohsuga et al. | 712/32 |
| 5,884,092 A | 3/1999 | Kiuchi et al. | 712/35 |
| 5,896,550 A | 4/1999 | Wehunt et al. | 395/846 |
| 5,903,779 A * | 5/1999 | Park | 712/300 |
| 5,918,045 A | 6/1999 | Nishii | 712/237 |
| 5,922,066 A * | 7/1999 | Cho et al. | 712/204 |
| 5,930,523 A | 7/1999 | Kawasaki et al. | 712/32 |
| 5,930,833 A | 7/1999 | Yoshioka et al. | 711/210 |
| 5,944,841 A | 8/1999 | Christie | 714/38 |
| 5,950,012 A | 9/1999 | Shiell et al. | 395/712 |
| 5,953,538 A | 9/1999 | Duncan et al. | 395/842 |
| 5,956,477 A | 9/1999 | Ranson et al. | 395/183.06 |
| 5,978,874 A | 11/1999 | Singhal et al. | 710/107 |
| 5,978,902 A | 11/1999 | Mann | 712/227 |
| 5,983,017 A | 11/1999 | Kemp et al. | 395/704 |
| 5,983,379 A | 11/1999 | Warren | 714/727 |
| 6,023,757 A | 2/2000 | Nishimoto et al. | 712/209 |
| 6,038,582 A | 3/2000 | Arakawa et al. | 708/501 |
| 6,038,661 A | 3/2000 | Yoshioka et al. | 712/244 |
| 6,091,629 A | 7/2000 | Osada et al. | |
| 6,092,172 A | 7/2000 | Nishimoto et al. | |
| 6,112,297 A * | 8/2000 | Ray et al. | 712/225 |
| 6,243,732 B1 | 6/2001 | Arakawa et al. | |
| 6,687,262 B1 * | 2/2004 | Jin et al. | 370/476 |

* cited by examiner

Note: LSU Result goes to the IMU where it is muxed with the multiplier result to form the overall imu_result_ex3. 32/64 bit busses running between blocks

US 6,820,195 B1

ALIGNING LOAD/STORE DATA WITH BIG/LITTLE ENDIAN DETERMINED ROTATION DISTANCE CONTROL

BACKGROUND OF THE INVENTION

The present invention relates generally to microprocessor or microcontroller architecture, and particularly to an architecture structured to handle unaligned memory references.

In computer architecture over the past decade RISC (Reduced Instruction Set Computer) devices, in which each instruction is ideally performed in a single operational cycle, have become popular. The RISC architecture has advantages over computers having standard architecture and instruction sets in that they were capable of much higher data processing speeds due to their ability to perform frequent operations in shorter periods of time. The RISC devices began with 16-bit instruction sets, and grew to 32-bit instruction set architectures having graphics capabilities. With such thirty-two bit instruction set architectures and more complex applications, there was a requirement for larger memory sizes, e.g., words two, four, or eight bytes in length (i.e., words of 16, 32, or 64 bits each). However, certain peripheral devices and applications generate or accept data of only one or two bytes. One result of this type of data is that it produces an unaligned word reference. Other examples, include some compressed data streams, which may pack data in ways that require access to unaligned data.

To understand what an unaligned word reference is, there needs to be a description of an aligned word reference. If a data object is of size N bytes at address A, then the object is aligned if A mod N=0. Table 1 shows examples of aligned and unaligned accesses of data, were the byte offsets are specified for the low-order three bits of the address (Computer Architecture A Quantitative Approach, John Hennessy and David Patterson, Morgan Kaufmann, Publishers, Inc., Copyright 1990, page 96, herein referred to as "Hennessy").

TABLE 1

| Object Addresses | Aligned by byte offsets | Unaligned at byte Offset |
|---|---|---|
| byte (8-bits) | 0, 1, 2, 3, 4, 5, 6, 7 | (never) |
| word (16-bits) | 0, 2, 4, 6 | 1, 3, 5, 7 |
| long word (32-bits) | 0, 4 | 1, 2, 3, 5, 6, 7 |
| quad-word (64-bits) | 0 | 1, 2, 3, 4, 5, 6, 7 |

Hence, for a machine capable of handling 4 byte long words, if incoming data is loaded sequentially as 2 bytes of data followed by 2 more bytes of data, the 4 bytes of data cannot be retrieved or stored in a single cycle because it would overlap a word boundary within memory. Thus, some prior art RISC devices either do not accept data in this form, in which case special procedures must be used to ensure that all data is aligned at word boundaries, or programming is required which uses up at least two consecutive instruction cycles. One way to ensure, for example, that all data is aligned in word boundaries would be to add extra bits to data of shorter length usually known as bit stuffing. Whether bit stuffing is used or the programming is altered, the unaligned references degrade the performance of these prior art RISC devices.

To handle the loading and storing of unaligned data words in a system, i.e., a data word which straddles a word boundary in memory (Table 1), prior art machines have also used either an alignment network to load or store bytes in a word or a shifter, which shifts the data only in those cases where alignment is required (Hennessy, ibid., pages 95–97).

FIG. 1 illustrates a prior art alignment network 114. In FIG. 1, memory 100 shows eight consecutive bytes (i.e., a byte equals 8 bits): Y3, Y2, Y1, D4, D3, D2, D1, and X4. Each byte in memory 100 is given an address which ranges from 0 to 7. For example, address 2 in memory 100 has memory contents Y1. The desired data bytes that are used in this and the following examples are D4 at address 3, D3 at address 4, D2 at address 5, and D1 at address 6. Each of these desired data bytes are to be loaded and stored to and from register R 110. Register R 110 has 4 byte positions: P4, P3, P2, and P1. Memory slice 112 of memory 100 shows a desired data byte D4 at address 3. D4 could be loaded from memory slice 112 through the alignment network 114 into register R 115 at positions P4, P3, P2, or P1. In this case D4 is loaded from memory slice 112 at address 3 to P4 in register R 115 through alignment network 114. Similarly, desired data bytes D3, D2, and D1 located in memory 100 addresses 4, 5, and 6 can be loaded through a similar alignment network to positions P3, P2, and P1 in register R 115 to give register R 110. This type of hardware alignment network 114 could be seen in Intel's 8086 and 8088 which came out in the late 1970s. The Intel 8088 was word and byte addressable. The 8088 used a cross-bar switch to swap bytes (Structured Computer Organization, $3^{rd}$ Edition, Andrew Tanenbaum, Copyright 1990, pages 215–217, pages 230–237). Note that Intel 8088 instruction set had separate instructions for shifting and rotating as these were considered different operations. For example, shifting one bit left would discard the leftmost bit, while rotating left would cycle the leftmost bit around to the rightmost bit.

FIG. 2 illustrates a prior art example of aligning a misaligned data word using shifting operations. An example can be seen in U.S. Pat. No. 4,814,976, RISC Computer With Unaligned Reference Handling And Method For The Same, Hansen, et al., issued Mar. 21, 1989 (herein referred to as "Hansen"). The contents of memory 100 at address 0–3 are loaded into register 120, locations PA4 to PA1. The contents of memory 100 in addresses 4 to 7 are loaded into register B 130 at locations PB4 to PB1. Register A 120 is then shifted left three places, so that D4 is in position PA4. Register B 130 is shifted right one place so that D3 is in location PB3, D2 is in PB2, and D1 is in PB1. Register A 122 is merged 144 with register B 132 to give the desired data located in the proper position in register R 110. The merge 144 was done by either overwriting locations PA3 to PA1 in register A 122 with locations PB3 to PB1 in register B 132 or the appropriate positions in register B 132 were overwritten by the appropriate places in register A 122. In the alternative, the merge 144 may copy the contents of PA4 in register A 122 to position P4 in register R 110 and may copy the contents of PB3, PB2, and PB1 of register B 132 into locations P3, P2, and P1 of register R 110.

Thus, unaligned words in memory were loaded and aligned in the microprocessor and aligned words in the microprocessor were unaligned and stored in memory using either an alignment network 114 of FIG. 1 or a shift left, shift right, and merge 144 of FIG. 2. These techniques were used, for example, on 32-bit words being loaded and stored from a 32-bit computer architecture. There are new problems which arise in a 64 bit architecture which loads and stores 32, 16, and 8 data bits. A 64 bit memory system requires twice as many alignment paths for bytes and half-words as a 32-bit memory system, as well as two 32-bits alignment pads for word accesses. Thus, the alignment network of the prior art becomes a complicated and expensive solution.

Also, in FIG. 2, the merge 144 becomes more complicated as it must handle many more don't cares 116 that are shifted into the registers. In addition, such prior art as Hansen, et al. does not disclose how sign extension is done in going from 32 to 64 bit words. FIG. 2 either has two M-bit shifters or a shift left and a shift right or a more complicated M-bit bi-directional shifter. Thus, as computer architectures go from 32 bit to 64 and maybe 128 bits, there needs to be a better method of handling unaligned data, which includes proper sign extension.

SUMMARY OF THE INVENTION

The present invention discloses a method for loading unaligned data stored in several memory locations, including a step of loading a first part of the unaligned data into a first storage location and rotating the first part from a first position to a second position in the first memory location. Next a second part of the unaligned data is loaded into a second storage location and rotated from one position to another position. Then the first storage location is combined with the second storage location using a logical operation into a result storage location. The storage locations may be, for example, 64-bit registers. The logical operation may be a bit-wise OR operation. The method may optionally include, performing masking, zero-extending and/or sign extending operations on the first storage location, when the first part of the unaligned data is in the second position of the first storage location.

The present invention also discloses a method for storing data into an unaligned plurality of memory locations, including rotating a first part of the data in a first storage location from a first position to a second position, and storing the data located in the second position to the unaligned plurality of memory locations at an address given by a first pointer. Then rotating a second part of the data in a second storage location from a third position to a forth position; and storing the data located in the forth position to the unaligned plurality of memory locations at an address given by a second pointer. The first pointer may, for example, include a high address and the second pointer include a low address.

These and other advantages and features of the present invention will become apparent to those skilled in this art upon a reading of the following detailed description which should be taken in conjunction with the accompanying drawings.

DESCRIPTION OF THE SPECIFIC EMBODIMENTS

The invention relates broadly to moving data in a microprocessor or microcontroller to and from memory, and particularly to loading and storing unaligned memory references.

Figure 1:
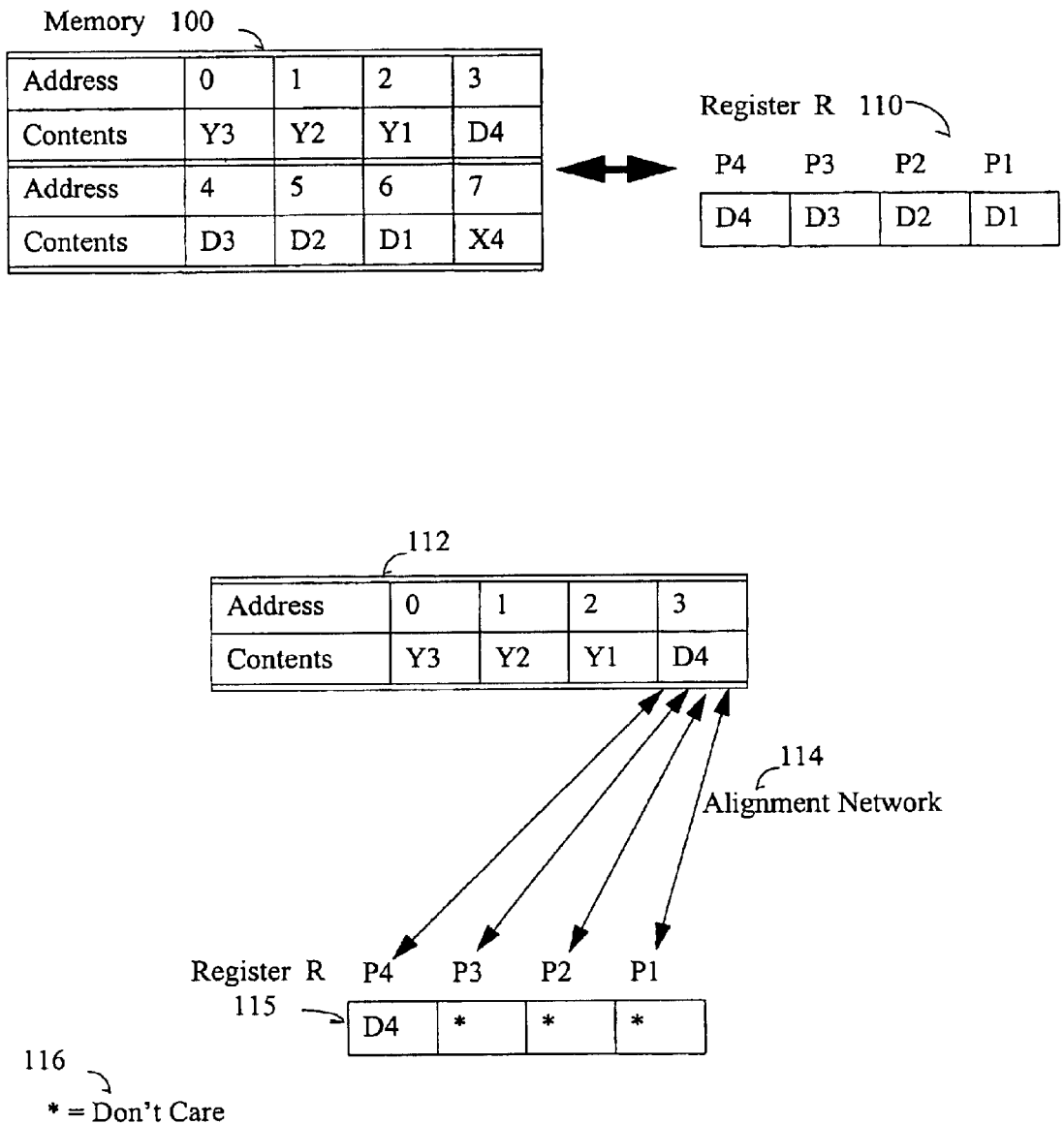
FIG. 1 illustrates a prior art alignment network.
Figure 2:
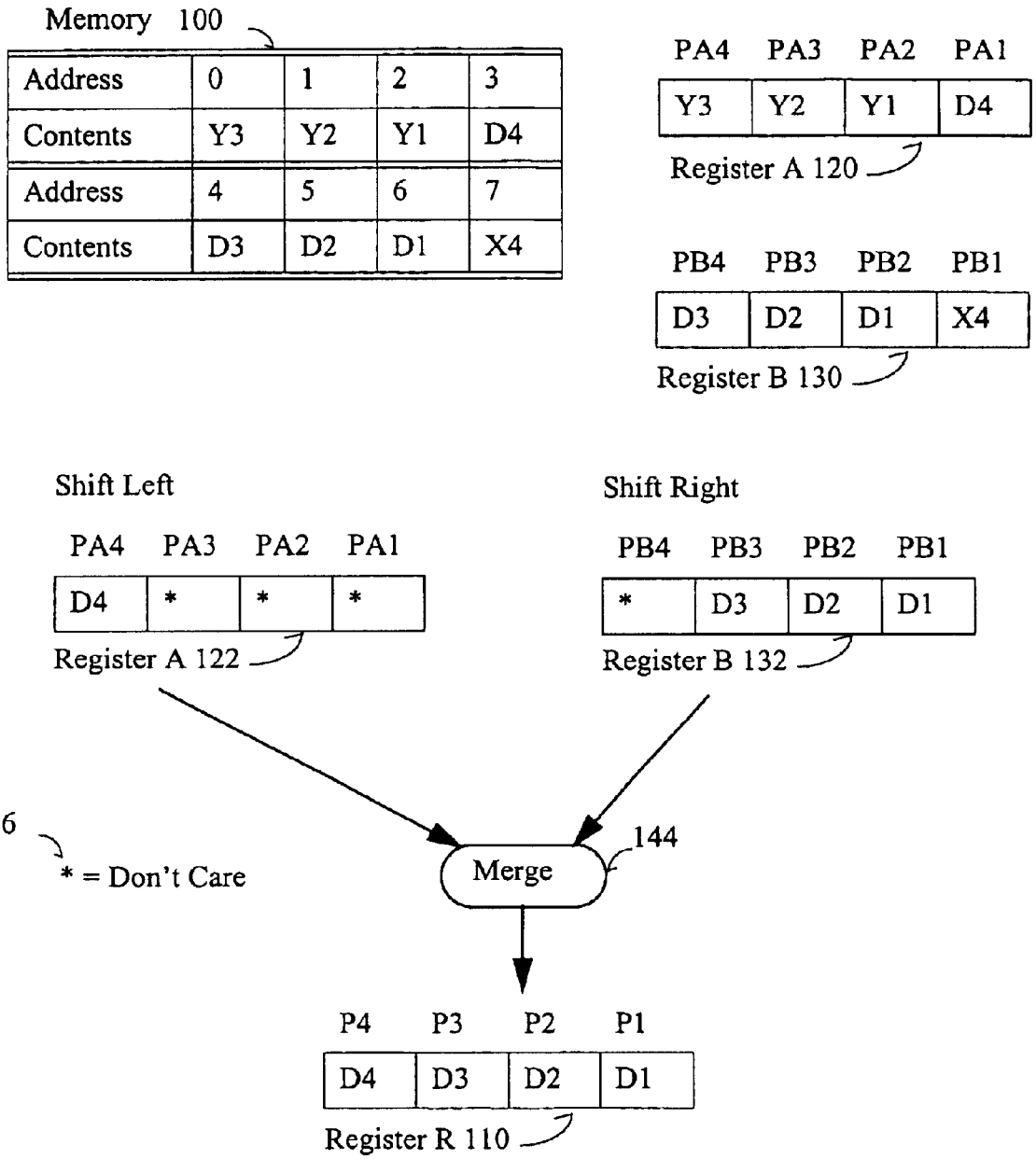
FIG. 2 illustrates a prior art example of aligning a unaligned data word using shifting operations.
Figure 3:
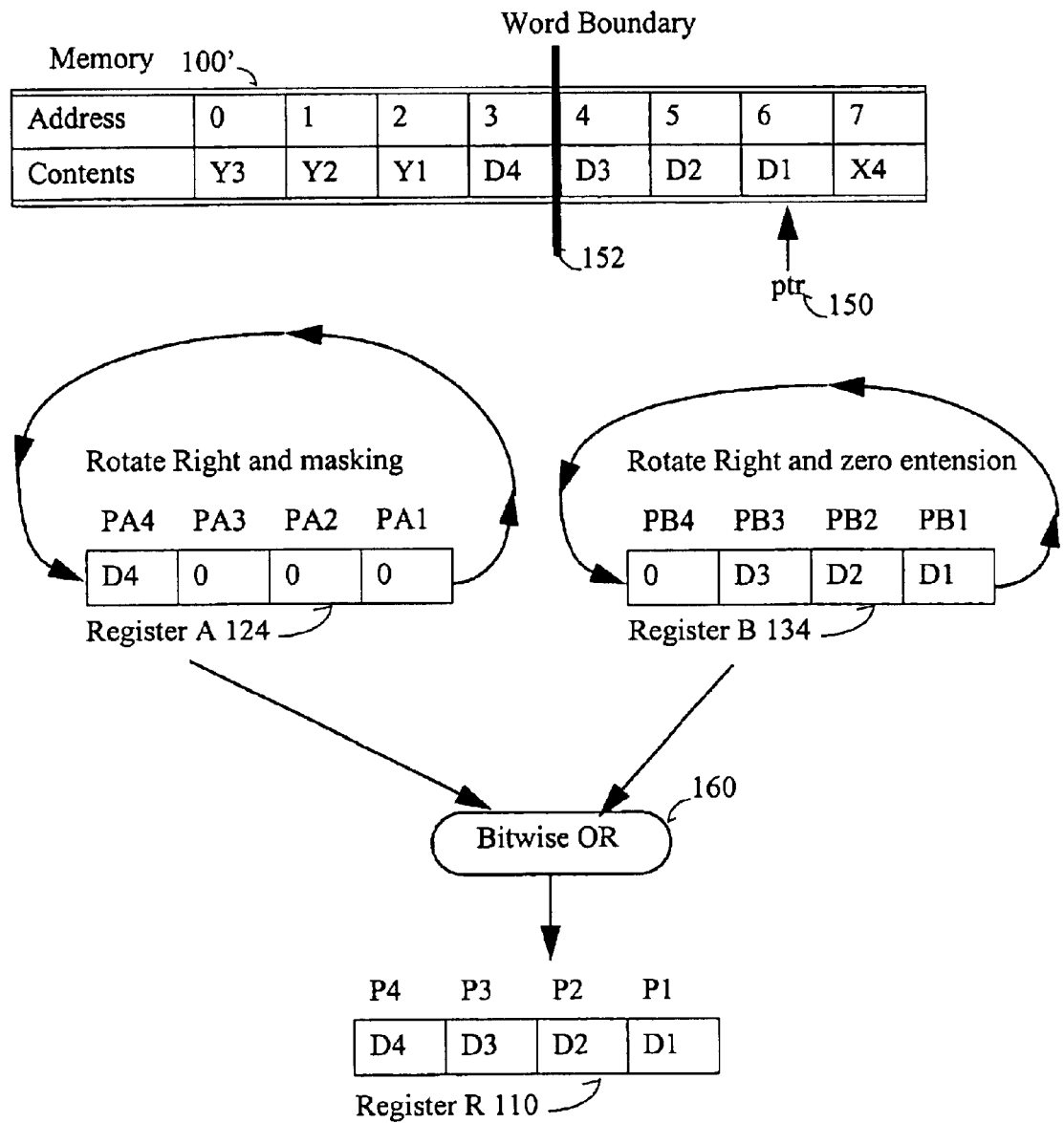
FIG. 3 illustrates a specific embodiment showing a load of an unaligned data word from memory to a register of the present invention.

FIG. 3 illustrates a specific embodiment showing a load of an unaligned data word from memory to a register of the present invention. In FIG. 3, memory 100 shows the four desired data bytes, D4, D3, D2, and D1 that are to be moved into register R 110. A pointer 150 gives the address of the lowest byte D1, i.e., the address equals 6 in memory 100' (which is the same as memory 100 in FIG. 2). The memory 100' word boundary 152 is between addresses 3 and 4. D4 as the lower byte of the word from addresses 0–3 in memory 100', is loaded into register A 124 at location PA1, and then rotated right one byte to give its new position PA4 in register A 124 in FIG. 3. Bytes to the right of D4 have been zero masked so that locations PA3 down to PA1 contains 0. Similarly, bytes D3, D2 and D1 in memory 100' are loaded into register B 134 at locations PB4, PB3, and PB2 and rotated right one byte to positions PB3 down to PB1 in register B 134. Bytes to the left of D3 are 0 extended so that location PB4 contains 0. Register A 124 is bit-wise "OR'd" 160 with register B 134 to give the result in register R 110. The rotation right of FIG. 3 is simpler and may require less hardware than either the dual M-bit shifters or M-bit bi-directional shifter of FIG. 2. In addition, the bit-wise OR 160 of FIG. 3 allows reuse of a logical operation already performed in the Integer Multimedia Unit (IMU), rather than needing a special merge unit 144 as in FIG. 2. Thus, FIG. 3 represents a simpler hardware implementation of a load of a unaligned word from memory 100 to register R 110 than that in the prior art.

Figure 4:
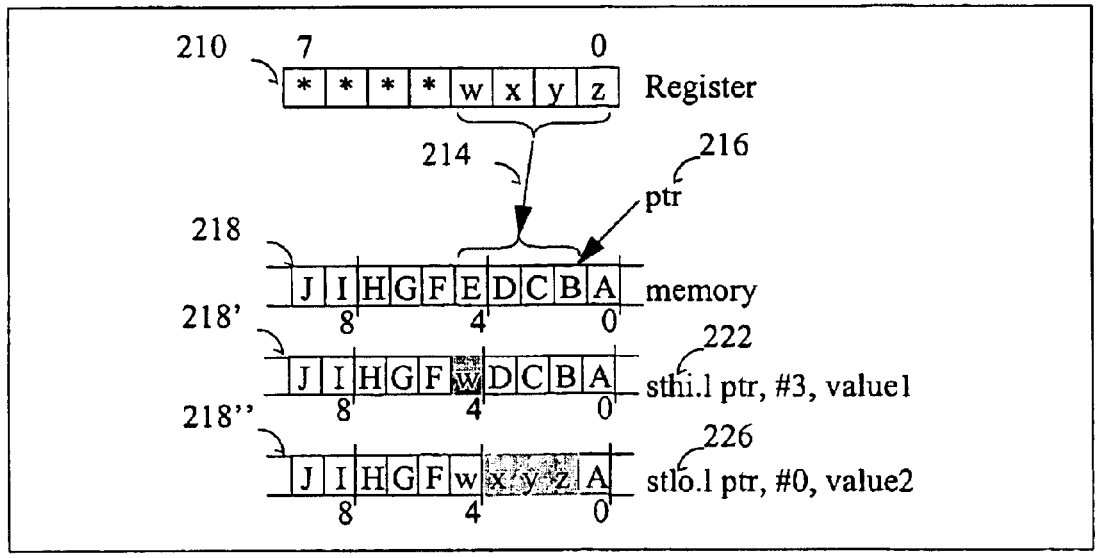
FIG. 4 illustrates a specific embodiment of storing a value in a register to an unaligned memory location of the present invention.

FIG. 4 illustrates a specific embodiment of storing a value in a register to an unaligned memory location of the present invention. In FIG. 4, the register 210 contains 8 bytes numbered from 7 down to 0 (Little Endian format). Bytes addressed 3 down to 0 of register 210 contain the bytes labeled w, x, y, and z (the contents of addresses 7–4 are don't care, "*"). These four aligned bytes in first register 210 are going to be stored via 214 in locations 4–1 containing E, D, C, and B in memory 218. The first byte B in memory 218 is pointed to by pointer 216 which represents an address in a second register. In the memory 218', byte w of first register 210 has overwritten E in location 4. This is an address that is offset by 3 bytes from pointer 216. An example instruction is illustrated in 222. In memory 218", bytes x, y, and z of register 210 have overwritten D ,C ,B in locations 3–1. The starting point for this store is given by the pointer 216 offset by 0 bytes, and the example instruction is shown in 226. Thus, a little Endian store of 4 bytes from register 210 to memory 218 starts at pointer 216 and proceeds 4 bytes, including the pointer 216, to the left. Memory 218" shows the bytes w, x, y, z located at addresses 4 down to 1.

Figure 5:
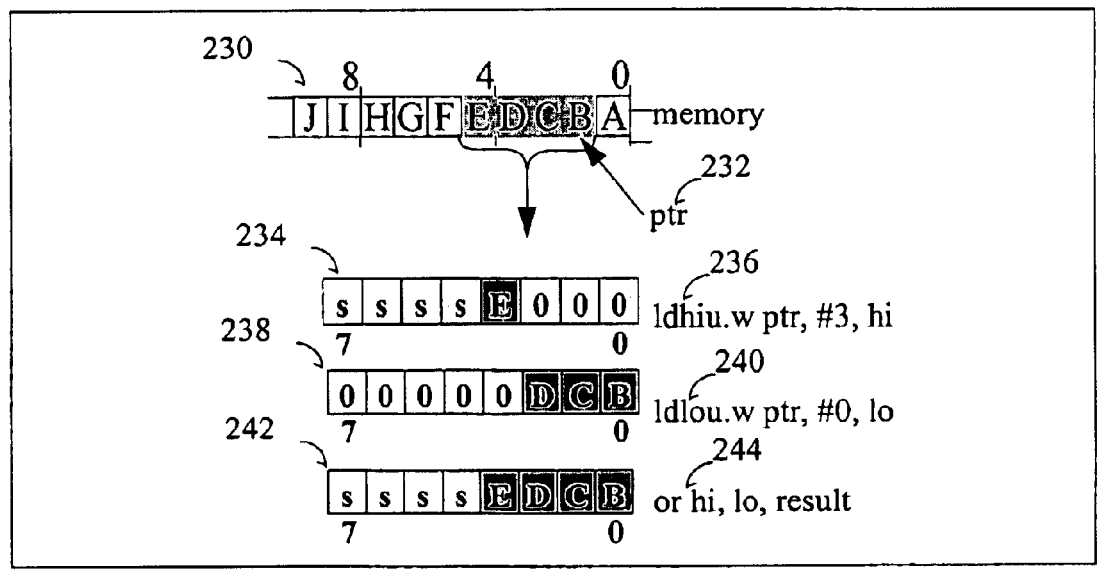
FIG. 5 illustrates another specific embodiment of a load of an unaligned memory word to a register including sign extension of the present invention.

FIG. 5 illustrates another specific embodiment of a load of an unaligned memory word to a register including sign extension of the present invention. In FIG. 5, memory 230 shows the long word (32-bits) boundaries at address 8, address 4 and address 0. The unaligned word is given by bytes E, D, C and B in memory 230. A pointer 232, which is an address put in the second register, points to the first byte B to be loaded from memory 230. The byte E in memory 230 represents the highest byte located by adding the pointer 232 with address 1 plus an offset of 3 to give an address of 4 in memory 230. Byte E in memory 230 is then loaded into hi register 234 at address 0 and rotated right to an address 3 in hi register 234. The bytes to the right of byte E in 234 have been 0 masked and the bytes to the left of byte E in hi register 234 have been sign-extended, i.e., "ssss". Instruction 236 gives an example of load high unaligned word with offset of 3 to a "hi" register. Bytes D, C, and B of memory 230 are loaded into register 238 starting at address 1 and rotated right to occupy addresses 2, 1 and 0 of low register 238. An example instruction 240 shows load lo unaligned word with offset 0 to a "lo" register. The bytes to the left of D in lo register 238 have been 0 extended. Register 242 shows the result of bit-wise ORing hi register 234 with lo register 238. The result is a sign-extended word with E, D, C, and B being aligned in result register 242. A sample instruction 244 shows the bit-wise ORing of the hi register 234 with the lo register 238 to give the result register 242.

In the specific embodiments illustrated, memory is byte addressed. The load and store instructions provide access to data using Little-Endian or Big-Endian representations. In a specific embodiment, the endianness of load and store instructions is specified at power-on reset, and does not change thereafter.

Note that Little Endian byte order puts the byte address whose address is zero at the least significant position in the word (the little end). Big Endian byte order puts the byte address whose address is zero at the most significant position in the word (the big end). Thus, in a Big Endian computer architecture, bits of data are thought of as being lined up from left to right, the lowest number and most significant bit being on the left, and in a Little Endian architecture, the bits are numbered right to left, the least significant bit and lowest number being located on the right.

In a specific embodiment, the load and store instructions transfer data between a register and memory, where some load instructions have signed and unsigned variants to perform the correct extension into the register. For byte (8-bit) and word (16-bit) object sizes, both signed and unsigned loads may exist. For long-word (32-bit) object sizes, only signed loads may be provided. This is because all 32-bit objects may be held in a sign-extended form in registers regardless of sign. For quad-word (64-bit) object sizes, there may be no distinction between signed and unsigned loads.

In the above specific embodiment two different sets of load and store instructions are provided:

The first set are: Aligned Load And Store Instructions and support naturally aligned data. This is where the address of the data is an exact multiple of the width of the access. If one of these instructions attempts a unaligned access, it will cause a misalignment exception.

The second set are: Unaligned Access Support. An example is software which may want to access objects that are unaligned(packed data structures for example). Instructions have been included that may be used to construct efficient sequences for loading objects that are unaligned, or with unknown alignment.

Instructions for loading and storing unaligned long-words and quad-words are provided. Instructions for accessing unaligned words (16-bits) may use existing aligned store and arithmetic instructions: For example:

```
/* little Endian example */
LD.B        Rbase, #0, Rtmp0
LD.B        Rbase, #1, Rtmp1
SHLLI       Rtmp1 #8, Rtmp1
OR          Rtmp0, Rtmp1, Result
``` where LD.B loads a byte from the effective address formed by adding the first source operand to a 10-bit immediate constant (Table 2). The byte is sign-extended into the result register; and

TABLE 2

| LD.B | | | | |
|---|---|---|---|---|
| 100000 | m | s | d | r |
| 31    26 | 25    20 | 19    10 | 9    4 | 3    0 |

LD.B Rm, s, Rd base←ZeroExtend64(Rm);
offset←SignExtend10(s);
address←ZeroExtend64(base + offset);
result←SignExtend8(ReadMemory8(address));
Rd←Register(result);

where the SHLLI instruction logically left shifts $R_m$ by $S_{<0 \; FOR \; 6>}$ and stores the result in $R_d$ (Table 3); and

TABLE 3

| SHLLI | | | | | |
|---|---|---|---|---|---|
| 110001 | m | 0001 | s | d | r |
| 31    26 | 25    20 | 19    16 | 15    10 | 9    4 | 3    0 |

SHLLI Rm, s, Rd source1←ZeroExtend64(Rm);
source2←ZeroExtend6(SignExtend6(s));
result←source1 <<source2;
Rd←Register(result);

where the OR instruction performs the bitwise-or of the contents of $R_m$ and $R_n$ and stores the result in the register $R_d$ (Table 4):

TABLE 4

OR

| 000001 | m | 1001 | n | d | r |
|---|---|---|---|---|---|
| 31   26 | 25   20 | 19   16 | 15   10 | 9   4 | 3   0 |

Figure 6:
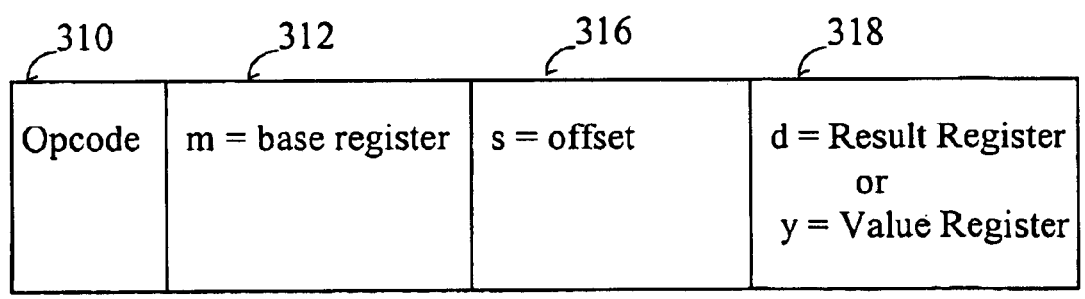
FIG. 6 illustrates a simplified format of the instructions used in a specific embodiment of the present invention.

OR Rm, Rn, Rd source1←SignExtend64(Rm);
source2←SignExtend64(Rn);
result←source1 or source2;
Rd←Register(result);

FIG. 6 illustrates a simplified format of the instructions used in a specific embodiment of the present invention. In FIG. 6, location 310 contains the operation or op code. Location 312 contains the base register, "m," which when added to the offset constant, "s," give an address of either the highest or lowest byte in the unaligned object. The result of the load operation is stored in a destination register "d." For a store operation the resulting value to be stored is in a register "y."

The instructions described in this embodiment can be used to load a unaligned long-word or quad-word object in 3 instructions. Storing a unaligned long-word or quad-word takes 2 instructions.

Instruction sequences for unaligned long-word loads return a sign-extended result. If zero extension is required, this may be performed in software, at the cost of an extra instruction.

An example of a unaligned load sequence is as follows:

LDHI.L ptr, #off+3, Rhi
LDLO.L ptr, #off, Rlo
OR Rhi, Rlo, result

The address of the highest byte in the unaligned object is passed to the "load high part" instruction (LDHI.L), while the address of the lowest byte in the unaligned object is passed to the "load low part" instruction (LDHI.L). Typically, the immediate operand to the high part instruction is (n−1) more than the immediate operand to the low part instruction, where "n" is the object size in bytes.

An example of a unaligned store sequence is as follows:

STHI.L ptr, #off+3, value
STLO.L ptr, #off, value

As for the unaligned load sequence, the address (e.g., ptr+#off+3) passed to the high part instruction (STHI.L) should point to the highest byte of the unaligned object, while the address passed to the low part instruction (STHO.L) should point to the lowest byte of the unaligned object (e.g., ptrt #off).

Table 5 shows examples of load and store instructions of a specific embodiment.

TABLE 5

| | Description |
|---|---|
| Un-Aligned Load Instructions | |
| LDHI.L | Load the high part of a unaligned, signed long-word from memory to a general-purpose register. |
| LDLO.L | Load the low part of a unaligned, signed long-word from memory to a general-purpose register. |
| LDHI.Q | Load the high part of a unaligned quad-word from memory to a general-purpose register (sign may be unimportant for objects the same size as a register). |
| LDLO.Q | Load the low part of a unaligned quad-word from memory to a general-purpose register (sign may be unimportant for objects the same size as a register) |

TABLE 5-continued

| | Description |
|---|---|
| Un-Aligned Store Instructions | |
| STHI.L | Unaligned store of the high part of a long-word from a general-purpose register to memory. |
| STLO.L | Unaligned store of the low part of a long-word from a general-purpose register to memory. |
| STHI.Q | Unaligned store of the high part of a quad-word from a general-purpose register to memory. |
| STLO.Q | Unaligned store of the low part of a quad-word from a general-purpose register to memory. |

Specific Embodiments of Hardware Implementations

Figure 7:
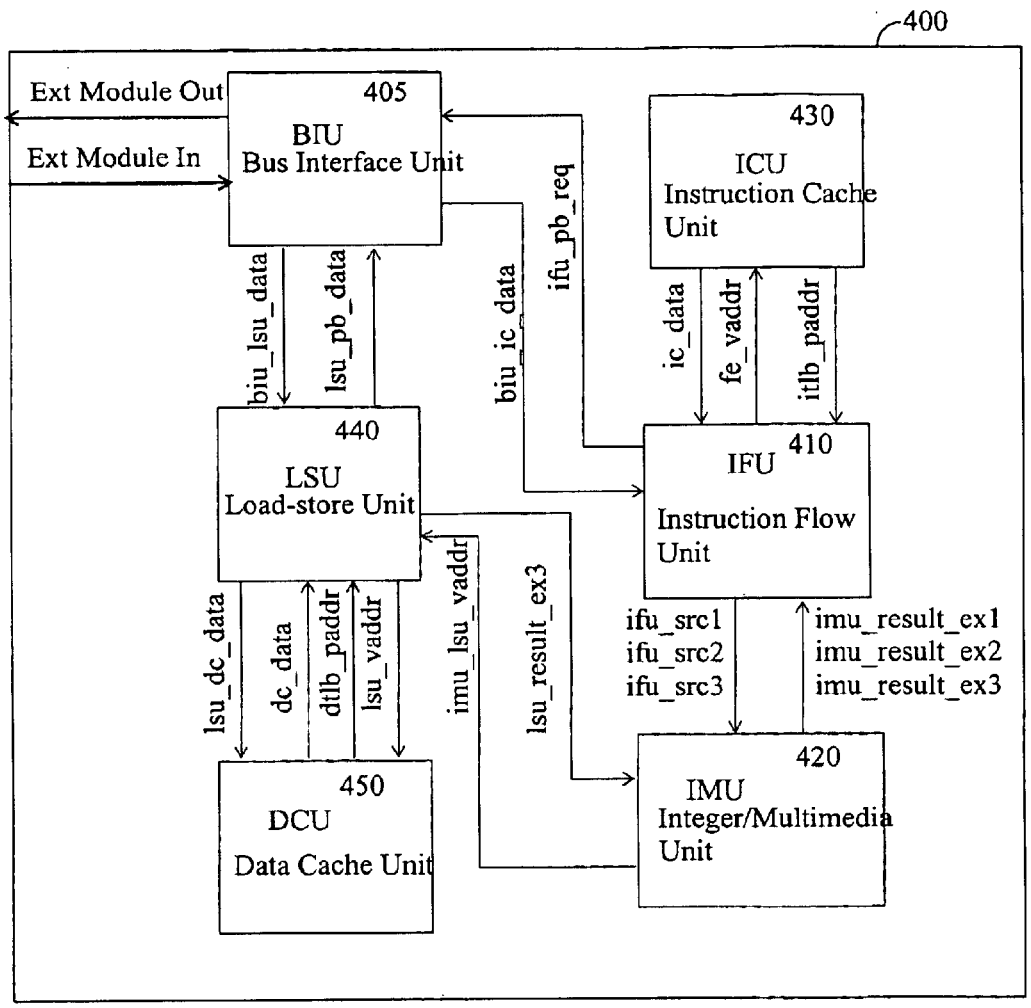
FIG. 7 illustrates an example of the top level partitioning of the Core.

In a specific embodiment, the present invention may be implemented in a CPU having a core unit 200 at the zero or root hierarchy level. The Core 400 may include six units at the hierarchy level 1, plus an optional detachable Floating Point Unit (FPU). FIG. 7 illustrates an example of the top level partitioning of the Core 400. Table 5 describes the functions of each unit in the core.

TABLE 5

| Hierarchy Level | Unit | Acronym | Description |
|---|---|---|---|
| 0 | S5 Core 400 | S5 | Top level core block |
| 1 | Bus interface unit 405 | BIU | Controls bus access to external modules such as peripheral modules and external memory interface. |
| 1 | Instruction Flow Unit 410 | IFU | The front end of the CPU pipe: fetch, decode, issue & branch. Also contains mode B emulation. |
| 1 | Instruction multimedia unit 420 | IMU | Handles all integer and multi-media instructions. The main CPU datapath. |
| 1 | Instruction cache Unit 430 | ICU | Comprises the Instruction Cache and the Instruction Translation Lookaside Buffer (TLB) |
| 1 | Load Store Unit 440 | LSU | Handles all memory instructions and Data cache control. |
| 1 | Data cache Unit 450 | DCU | Comprises the Data Cache and the Data Translation Lookaside Buffer (TLB) |
| 1 | Floating Point Unit (not shown) | FPU | Detachable Floating point decoder, pipe control and execution pipe (not shown in FIG. 7). |

In a specific embodiment the load/store unit (LSU) 440 performs the functions of: executing all memory related instructions, handling snoop requests from the BIU 405, handling access to configuration registers, handling access to debug registers via configuration space requests from the BIU 403, maintaining data cache, e.g., cache coherency, line-fill, and/or writeback, checking access permissions, supporting data watchpoints, performing load and store on behalf of the FPU, and performing some data transfer between the FPU and the Core 400.

Figure 8:
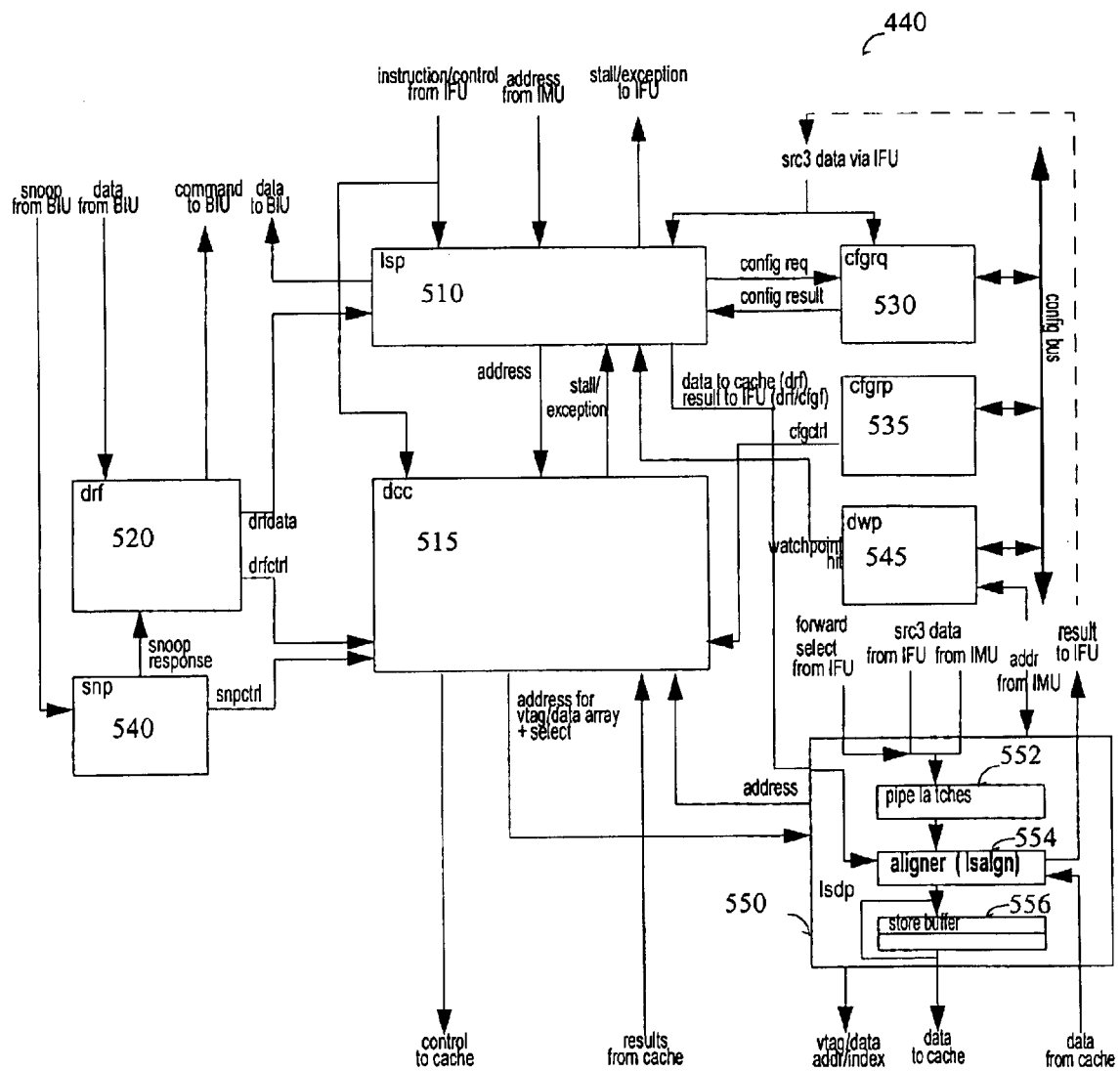
FIG. 8 illustrates a simplified block diagram of a specific embodiment of the LSU of the present invention.

FIG. 8 illustrates a simplified block diagram of a specific embodiment the LSU 440 of the present invention. The LSU 440 includes 8 functional blocks given at hierarchy level 2 in Table 7.

TABLE 7

| Acronym | Name | Hierarchy level | Description |
|---|---|---|---|
| lsp 510 | lspipe | 2 | Load/Store Pipeline Control Block |
| dcc 515 | | 2 | Data Cache Controller |
| drf 520 | drefill | 2 | Drefill Block |
| cfgrq 530 | | 2 | Configuration block requester |
| cfgrp 535 | | 2 | Configuration block responder |
| snp 540 | snoop | 2 | Snoop block |
| dwp 545 | datawp | 2 | Data watchpoint |
| lsdp 550 | lsdatapath | 2 | LSU datapath block |
| lspalgn 554 | | 3 | Align, (Sign/Zero) extend block |

The lspipe block, lsp 510, controls the load/store pipeline. This block coordinates and sequences all core memory accesses. lspipe 510 receives a data value for the current instruction via a path through the IFU 410 which utilizes the existing result bus in the main IMU 420 datapath. The lspipe block 510 handles the CPU pipeline aspects of the LSU unit. It is responsible for holding the required data at the start of the EX1, EX2 and EX3 stages of the pipeline and controls the stalling of CPU execution. In additional trace information is passed to the trace channel at the EX4 (WB) stage.

The dcc block 515 is the main data cache controller block. It contains the FSMs which sequence operations on the data cache arrays to implement the various operations. It includes a FSM that receives requests from the lspipe/IFU to execute instructions. The FSM sequences the series of requests to the cache and drefill, etc. required to execute the instruction. Additionally, the dcc block 515 receives the cache requests from all other blocks (drefill 520, snoop 540, cfgrp 535) and arbitrates between these and requests generated by a FSM to determine which resource access the cache in any given cycle The drefill block, drf 520 on behalf of LSU 440 interfaces to the BIU 405 including, cache related cycles like cache line-fill, and non-cacheable memory accesses. The drf 520 can access the cache data array 'on demand' to perform write-back and fill activities. It contains buffering for 4 pending cache writes and address buffers for 2 BIU 405 accesses and 2 pending store buffer writes into the data array—this enables stores to be fully pipelined.

The config request block, cfgrq 530, handles the interface between the LSU and the configuration bus. The configuration bus provides the mechanism for the CPU to access configuration registers and cache/TLB state as well as allowing the debug controller to access the debug registers via the BIU 405. The 'request' side, i.e., cfgrq block 530, accepts configuration requests from either the lspipe 510 or drefill 520 blocks, and places these on the bus and waits for a response Config responder block, cfgrp 535, receives requests made by the config request block 530 for access to the data cache configuration space. The cfgrp 535 makes the relevant request to the dcc 515 and returns the result on the config bus.

The datawatchpoint block, dwp 545, compares access addresses with the two data watchpoint ranges and signals any hit to the lspipe block 510, which in turn determines whether a watchpoint and/or exception is triggered depended on control signals associated with that access received from the IFU 410. The address ranges are setup via the configuration bus.

The snp block 540 is a block that receives snoop requests from the BIU 405 and then sequences through the locations in the cache where the supplied physical address could reside. If it finds a hit it will request the drf 520 to write back any dirty data, and if there was a write snoop request, it will then invalidate the line.

Load/store datapath block, lsdp 550, includes the operations relating to 64 bit data in the main execution datapath. The data aligner, lsalgn 554, is here along with the data elements of the store buffer 556. Results are returned to the pipefile via a result bus which is shared with the IMU 420 E3 stage. This path is also used to pass data from the datapath to the main LSU block through the IFU 410.

The lspalgn block 554 is the byte alignment and sign/zero extension block. All memory operands go through this block. This block also supports little Endian mode and big Endian mode. This block 554 is part of lsdp 550 and handles the data alignment required for data load and store operations In a specific embodiment the LSU may include a single aligner to perform the alignment rotates and sign/byte selection required for load and store operations, rather than having a separate rotator on each of the load and store paths. In a specific embodiment only a right rotator is used, since a left rotate of k bytes is equivalent to a right rotate of (8-k) bytes for a 64-bit architecture. In an alternative embodiment a bi-directional rotator is used. In both embodiments the two operations share the same resource to reduce area. The minor cost of this is that the alignment step of both load and store has to occur in the same pipeline stage to avoid resource hazards. This results in a store operation requiring 1 extra cycle before the data is stored into the cache. This extra cycle is hidden by pipelining and there is little effect on performance unless the code immediately requires reloading data that has just been stored. However, in this case a compiler should be able to reuse data from the original register.

The path which is of major concern in the LSU is that of data being read from the data array which then may be passed through the aligner/sign-extension logic 554 before being sent to the various forwarding points in the IMU 420 and pipefile. Since it is desirable to minimize the length of this path, the aligner 554 may be placed inside the IMU 420 datapath.

The LSU 440 may use 3 pipeline stages to access the cache:

1) E1: Address is calculated (handled by IMU on behalf of LSU).
2) E2: Virtual tag (vtag) comparison is made and, for load operations, data read.
3) E3: For loads, data selected on the basis of comparison results and is aligned and sign extended. For stores, data is aligned and sent to the pending store buffer, if data cannot be written immediately.

This behavior may be fully pipelined—an instruction may be at each pipeline stage simultaneously and, assuming all accesses "hit" using virtual tag (vtag) comparison, execute in one instruction per cycle.

For store operations where data enters the store buffer at the end of the E3 stage, the data is yet to be written to the data array, however from a pipeline perspective the instruction is complete.

There is also an E4/WB stage in the lspipe block 510 that may be used to pass data to the trace channel and may not contribute to instruction execution.

The drefill block 520 contains a store buffer that contains upto 2 pending stores. The drefill 520 and dcc 515 may use 'free cycles' where the data array is not being otherwise accessed to write this data to the cache.

Memory operations that are received while stores are pending in this buffer are checked for address match—if this following operation 'collides' with a pending store then it is stalled until the store has been written to the cache to ensure correct execution of load/store actions.

The dependency check between items in the store buffer and a subsequent memory access is done on the basis of the 64-bit word address (i.e. bits [32:3] of the address). This may be extended to include an upper/lower 32-bit word clash check to aid 32 bit software—in this case a load from the opposite half of the 64-bit word to that in which there is a pending 32-bit store would be permitted to continue.

The LSU 440 may handle 2 outstanding BIU 405 (i.e. external memory) fill accesses (caused by prefetch instructions or cache misses) or non-cacheable loads. Additionally the LSU 440 provides buffering for write-back and stores.

Prefetch instructions do not block execution and execution resumes as soon as a line file and, if required, write back request, has been issued to the BIU 405.

A Load miss may stall the pipeline until the critical word is received. Store may only stall the pipeline until the critical word has been written back (assuming writeback is required). At this point the pipeline will restart while the rest of the fill continues.

Further memory operations can occur while an outstanding request is still filling a line. If such a memory request causes a cache miss then a second fill request may be sent to the BIU. As with the first fill request, the cache is blocked from any access until the second fill request is acknowledged by the BIU. The CPU pipe is again stalled until the first critical word returns. Further memory request from CPU pipe may be accepted as long as they can be serviced from the cache. If a third miss occurs then this is blocked until the first fill completes.

The LSU controls a virtual cache. There may be problems inherent in a virtually tagged (vtag) cache due to synonyms—data referenced by one virtual address may also be referenced by other synonymous virtual addresses. Thus the cache contains a separate record of the physical tag (ptag) for all data and this is used in conjunction with TLB translation to check for a synonym hit if the initial virtual tag based look up fails.

A software requirement is that for any two virtual address that map to the same object (i.e. physical address) then the virtual indexing map both to the same cache set. For 16 kB pages and above there may be no issue as no bit subject to address translation is used to index the cache. However, for 4 kB pages some index bits are subject to translation. Because of this it is necessary for software to ensure that all virtual addresses that map to the same physical address have the same values for bits [13:12]. This requirement may be needed for any cache (virtual or physical) that uses virtual indexing.

Due to the cache being based on virtual tagging then no reference needs to be made to the TLB in case of a (virtual tag) cache hit. Therefore, the virtual tag array also contains a copy of the page permission and other page based information from the appropriate TLB entry to enable access permissions etc. to be checked at the same time as the tag comparison. This ensures that any access violation is detected without the need to consult the TLB.

The LSU supports a full LRU replacement policy which can be augmented by control register bits which can 'lock' some of the cache ways (on a per cache basis). Data can be loaded into a locked way through a special mode of prefetch. Other than data update through store hit an entry in a locked way cannot be modified.

Data read into the CPU may have its bytes re-ordered so that they are arranged as a 64 bit quantity with, for example, the most significant byte in byte position 7 and the least significant byte in byte position 0.

This ensures that all 64 bit data is in a consistent Endian-ness internally. Sub-word selection performed by the align/sign-extend block will take system Endian-ness into account and select the correct sub-word by xor-ing the bottom 3 bits of address used to select the data with the appropriate mask.

In a specific embodiment of the LSU works with cache sizes of 16 kB, 32 kB or 64 kB. Because of this the LSU takes into account all three cache sizes. For example, 9 bits will be passed as a set index which is required for a 64 kB cache; a 32 kB cache will ignore the most significant bit, while a 16 kB cache will ignore the 2 most significant bits. Similarly the tag passed for comparison may be based around the requirements for a 16 kB cache with redundant bits in the 32 kB and 64 kB cases. The set-based address clash detection may perform a 7 bit comparison to handle set clashes in a 16 kB cache which may report false clashes in 32 kB and 64 kB caches.

Figure 9:
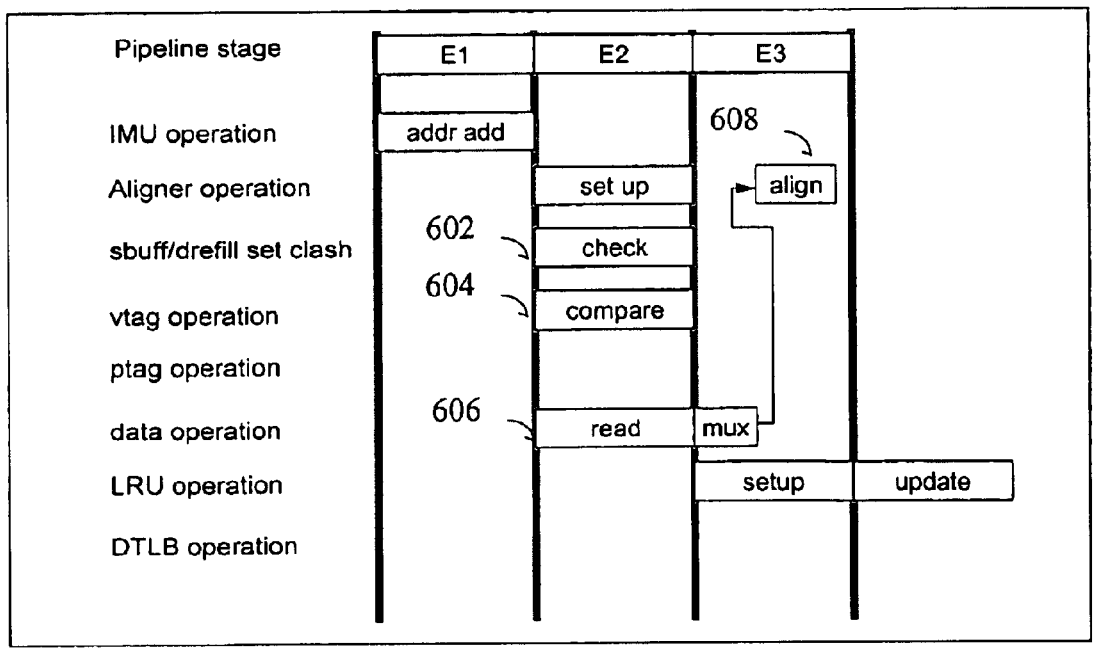
FIG. 9 illustrates the pipeline behavior for a load with a cache hit in a specific embodiment of the present invention.

FIG. 9 illustrates the pipeline behavior for a load with a cache hit in a specific embodiment of the present invention. This assumes that there are no other load/store operations in the preceding or following instructions. Vtag comparison 604 is done in parallel with data extraction 606 and the match signals are used to select the correct data in the next cycle. Data is returned in 3 cycles causing a 2 instruction load/use penalty. This scheme shows the store buffer/fill clash checking 602 being done in E2. This ensures all information required to determine if a stall is required is available at the start of the E3 stage. In E3 the data, if necessary, is aligned.

An aliased hit occurs when there is a miss on the vtag comparison but when the subsequent ptag comparison (using the physical address translated by the DTLB) returns a hit. Again it is assumed that there are no load or store instructions in the preceding or following cycles. This sequence causes a 3 cycle pipeline stall while the initial vtag miss is handled.

The vtag line for the aliased hit should be updated to refer to the most recent alias (as locality of reference suggests that this is the must likely alias to be used next to refer to this data—note that this update is not 'necessary' for correct behavior but should aid performance).

When the cache controller determines that there is both a vtag and ptag miss then a request is made to the drefill block 520 for a line refill. The drefill block 520 then controls the write-back and fill activities while the pipeline control part of the cache controller waits for the critical word to appear.

To avoid any danger of data to be written back from the cache being over-written by fill data before being written back it is important that the read for write-back happens in the 4 cycles following the burst read request—this ensures no danger exists. In this specific embodiment this is not an issue as any fill request will take around 16 cycles to be serviced. In an alternative embodiment the dcc 515 may warn the drefill 520 block of the probability of an miss to allow the first read to be started speculatively.

During the cycle where the miss is detected (after the ptag comparison) the dcc state machine will move into a holding cycle if the drefill block is indicating that the fill request cannot be accepted. Note that the dcc needs to know if fill with writeback is required to determine this. The writeback is determined form the valid bit and the dirty state bit which may already have been read. The pipeline is stalled as soon as the vtag miss is detected. The dcc 515 holds the stall until it completes setting up the fill. For normal loads it then maintains the stall until critical word data is received.

Figure 10:
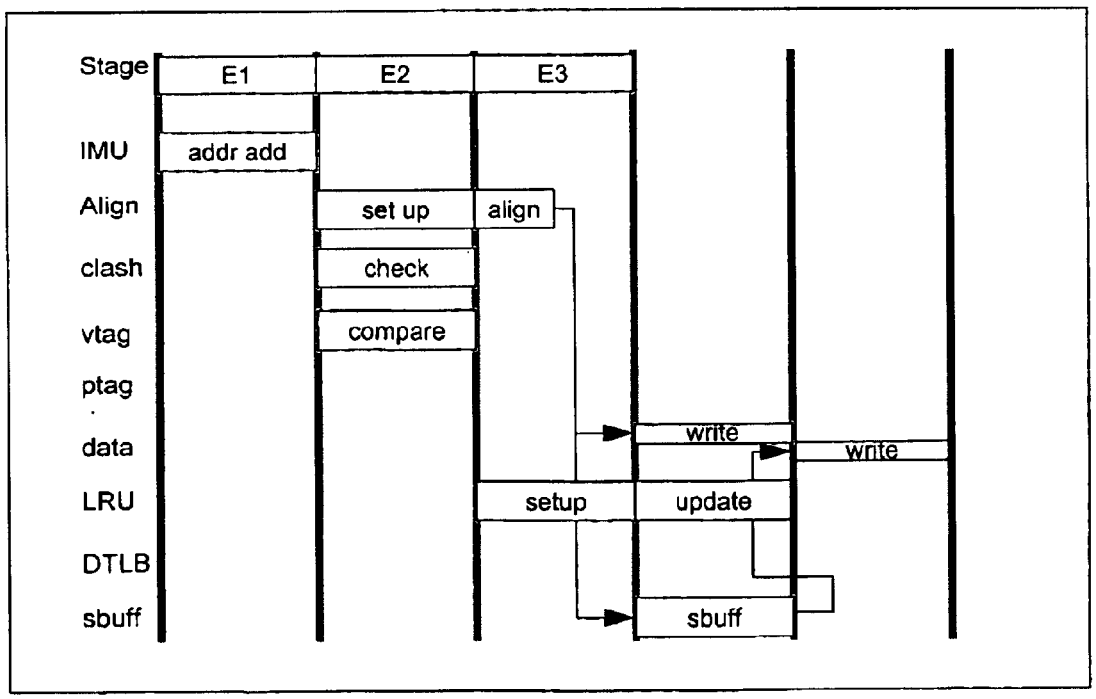
FIG. 10 shows the pipeline behavior for a store with a cache hit in a specific embodiment of the present invention.

FIG. 10 shows the pipeline behavior for a store with a cache hit in a specific embodiment of the present invention. When the cache hit is detected then store data (aligned to the correct alignment for the store along with byte-select values) is either written directly to the data array or placed into the store buffer depending on whether the data array is required for a following load or whether there already is data in the store buffer. If data is placed in the store buffer then it will be taken from there and written to the data array in the next available cycle (i.e. the next cycle in which no data array access occurs).

For the aliased hit the aligned data is sent to the store buffer instead of being send back to write-back as is the case for loads.

For the store miss the pipeline store waits until any writeback from the word where the data is to be stored has occurred and then sends data to the store buffer.

An Example Byte Alignment and Sign-extension Block (lspalgn)

A specific embodiment of the lspalgn block 554 does byte alignment and sign-extension operations on 8-byte data (64-bits) loaded from/stored to the cache to extract valid byte parts that corresponds to the final result of a Load-Store instruction. As this block forms part of a critical timing path it is a special datapath block and thus is separated out from the rest of the lspipe 510. However some of the control logic remains in the lspipe and passes control signals to the datapath a cycle ahead of when they are needed.

Figure 11:
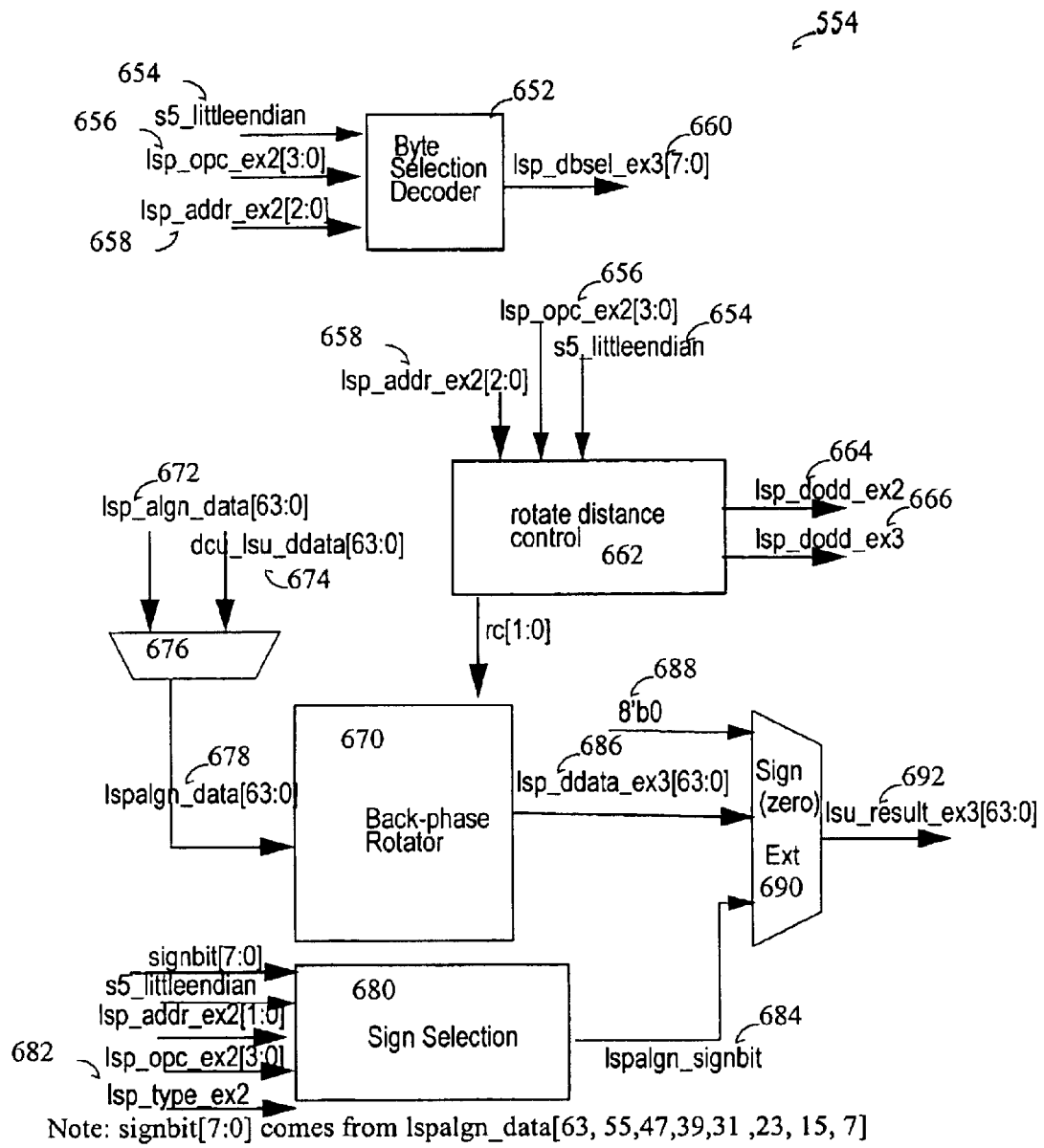
FIG. 11 illustrates a simplified block diagram of the align and sign extension block.

FIG. 11 illustrates a simplified block diagram of the align and sign extension block, lsalgn 554. In FIG. 11 the Byte selection Decoder 652 determines which bytes in the destination 8 byte word are updated by a store. For example, a store of a byte to the 3rd byte in the word would yield a byte select mask of 0000100. The inputs to the Decoder 652 are: s5_littleendian 654 which is 1 for a little Endian system; lsp_opc_ex2[3:0], which comes from lspipe 510 and is the opcode of the instruction in the E2; and lsp_addr_ex2[2:0] 658 which is the address of the highest/lowest byte of the bytes that are to be rotated in a 8 byte part. The input data arrives through a selector 676 which chooses the 64-bit data from either the lsp 510, lsp_algh_data 672 or from the DCU 450, i.e., dcu_lsu_ddata 674. The selected data, lspalgn_data 678, goes into a Back-phase rotator 670. The rotation is controlled by bits rc[1:0] 668 which come from the Rotate Distance Controller 662. The Rotate Distance Controller 662 sends lsp_dodd_ex2 664 and lsp_dodd_ex2 666 to the DCU 450, which is then multiplexed to select the lsu_dcu_dodd signal. This signal provides rc[3]. For the typical case, where the vtag and data array are read in the E2 phase, then it is lsp_dodd_ex2 that is used. However, if there is a vtag miss and then a ptag hit then the data array is read a second time (to read the data selected by the ptag hit) and now the instruction is in the E3 stage so the lsp_dodd_ex3 signal would be selected. Similarly if there was a cache miss then when the data returned from the BIU, the lsp_dodd_ex3 signal would be used to perform first stage of rotation that is needed before the main rotate block on that path to match the stage that is in the data from the cache path The output of the rotator 670 is lsp_ddata_ex3 686 and for a store operation, represents the bytes to be stored, i.e., the Sign Ext. block 690 is a pass through. No sign or zero extension is needed for store. For a load instruction Sign (zero) extension 690 is performed on lsp_ddata_ex3 686 depending on the value of lspalgn_signbit 684 from the sign selection block 680.

The Sign Selection block 680 produces the sign bit 684 for the muxes in the sign/zero extend block 690. There is an input lsp_type_ex2 682 into block 680, which gives the type as one of signed/unsigned byte, signed/unsigned (16 bit) word, signed/unsigned (32 bit) long word or (64 bit) quadword. The Sign Selection block 680 determines the sign bit of the result (from the sign bits of the bytes in the data and the result size), and the Sign/zero Extend block 690, on a per byte basis, selects whether the result in that byte position comes from either: 1) the byte from the rotate output 686, 2) sign extension byte 684 (determined by the sign bit), or 3) 0 byte 688, i.e., 8b'0, (for zero extension). An example of the use of the 0 byte is for a unaligned 32 bit load of the upper part of a long word, e.g., byte H, where the lower 3 bytes are 0. If the word at that address is ABCDEFGH then the rotated output will be DEFGHABC (as the H from position 0 has been moved to the correct place in the result 32 bit word). The sign selection block produces controls to the sign/zero extension so that bytes 7–4 are selected by the sign bit of H. Byte 3 is the result from the rotator (i.e. H) and bytes 2–0 are 0. I.e. the result is SSSSH000 where S is the sign extension of H.

Figure 12:
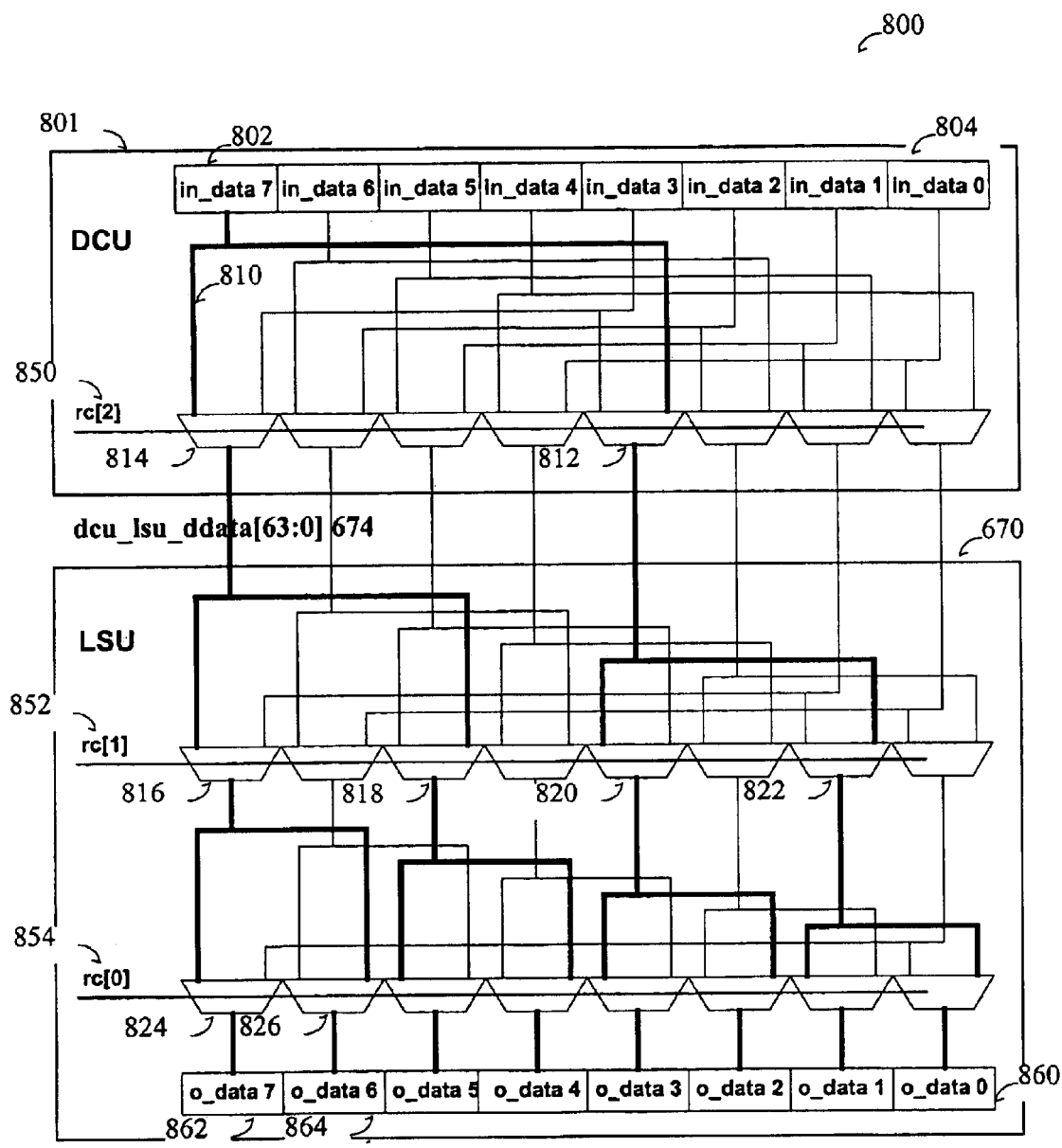
FIG. 12 shows a specific embodiment of a 8 byte Right Rotator 800 of the present invention.

FIG. 12 shows a specific embodiment of a 8 byte Right Rotator 800 of the present invention. The input is 8 bytes in Little Endian format with each byte put in a latch: in_data7 802 downto latch in_data0 804. The byte 0 in latch in_data0 804 is from bit 7 downto bit 0; byte 7 in latch in_data7 802 is from bit 63 to bit 55 and so on. The rc[2:0] 850, 852, and 854, are the rotate distance control signals. The path for data from the most significant word 802 in the cached data to the rotated data output, o_data latches 860, is shown in bold lines to demonstrate how each byte in the input can be switched to any output byte. For example, the output 810 of in_data7 802 is split to goto multiplexers 814 and 812 in the first stage 801 (DCU). The output of mux 814 is then split into muxs 816 and 818 (in the Back-Phase Rotator 660). Or, depending on the select signal rc[2] 850, the output 810 of may be split by mux 812 in the DCU 801 to muxes 820 and 822 in the Back-Phase Rotator 660 (LSU). The muxes 816 and 818 are controlled by rc[1] 852. The output of mux 816 may go to muxes 824 and 826, and depending on the select signal rc[0] 854, the input data byte 802 may go to latches o_data7 862 or o_data6 864.

In a specific embodiment, for timing reason, the 8-byte rotator may be split into front-phase rotator 801, which rotates the double word input data in DCU 450, and back-phase rotator 660, which does byte and word rotates in LSU 440. In an alternative embodiment the 8-byte rotator is not split, but included in the front phase rotator 801. In another embodiment the 8-byte rotator is not split, but included in the back phase rotator 670. The input data of the rotator is [7,6,5,4,3,2,1,0] which means the order is byte7, byte6, byte5 . . . etc. For example, rc[2:0] is 3'b010 which makes in_data[63:0] rotate rightward for 2 bytes. The result is [1,0,7,6,5,4,3,2] which means in_data byte 1 rotate to MSB and in_data byte 2 rotate to LSB. The possible rotations are shown in Table 6.

TABLE 6

| rc[2:0] | o_datat[byte] |
|---------|---------------|
| 3'b000  | [7, 6, 5, 4, 3, 2, 1, 0] |
| 3'b001  | [0, 7, 6, 5, 4, 3, 2, 1] |

TABLE 6-continued

| rc[2:0] | o_datat[byte] |
|---|---|
| 3'b010 | [1, 0, 7, 6, 5, 4, 3, 2] |
| 3'b011 | [2, 1, 0, 7, 6, 5, 4, 3] |
| 3'b100 | [3, 2, 1, 0, 7, 6, 5, 4] |
| 3'b101 | [4, 3, 2, 1, 0, 7, 6, 5] |
| 3'b110 | [5, 4, 3, 2, 1, 0, 7, 6] |
| 3'b111 | [6, 5, 4, 3, 2, 1, 0, 7] |

Figure 13:
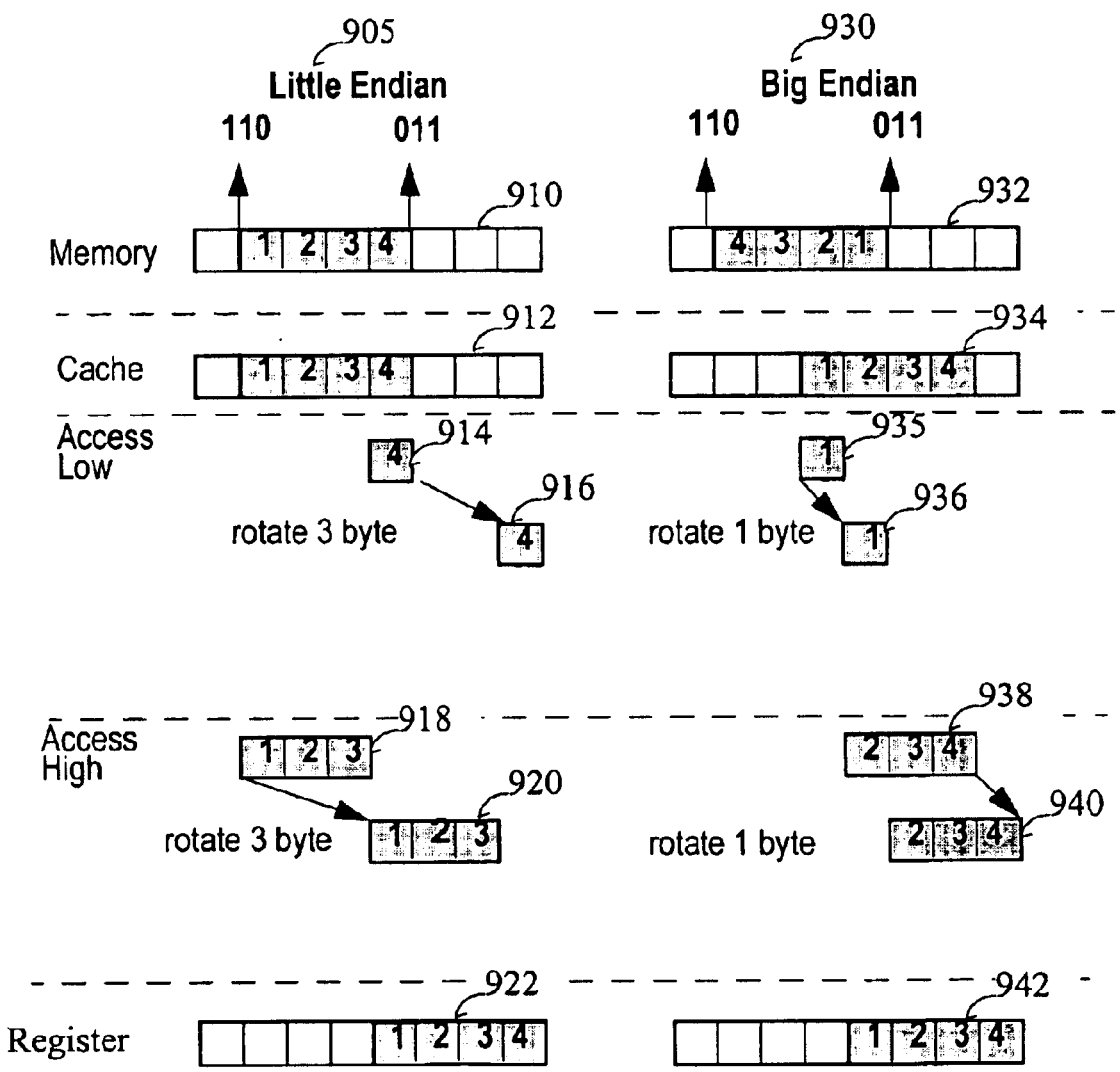
FIG. 13 shows an example of how a 4-byte unaligned word load instruction achieves alignment in different Endianness.

FIG. 13 shows an example of how a 4-byte unaligned word load instruction achieves alignment in different Endianness. In Little Endian order 905, there are 4 data bytes (1,2,3,4) between addresses 110 and 011 in memory 910. This data is mirrored in cache 912 (1,2,3,4). The low part of the data 914 (4) rotates 3 bytes toward the right 916 and the high part of the data 918 (1,2,3) rotates 3 bytes toward the right 920. The result is an aligned long word in Register 922. In the Big Endian order 930, in this specific embodiment the data is stored in the cache 934 in Little Endian order. The low part 935 rotates 1 byte toward the right 936 and high part 938 rotates 1 bytes toward the right 940. The detailed rotate distances of different Endianness for 8-byte and 4-byte loads are shown in Table 7 and Table 8. The rotate distances control rc[1:0] in the 4-byte case are analogous to the 8-byte case with the back-phase rotator in the LSU.

TABLE 7

Right rotate distance for unaligned 8-byte load instruction

| lsp_addr_ex2 [2:0] (In Memory) | Low Part (Little Endian) | High Part (Little Endian) | Low Part (Big Endian) | High Part (Big Endian) |
|---|---|---|---|---|
| 000 | 0 | 1 | 0 | 7 |
| 001 | 1 | 2 | 7 | 6 |
| 010 | 2 | 3 | 6 | 5 |
| 011 | 3 | 4 | 5 | 4 |
| 100 | 4 | 5 | 4 | 3 |
| 101 | 5 | 6 | 3 | 2 |
| 110 | 6 | 7 | 2 | 1 |
| 111 | 7 | 0 | 1 | 0 |

TABLE 8

Right rotate distance for unaligned 4-byte load instruction

| lsp_addr_ex2 [2:0] (In Memory) | Low Part (Little Endian) | High Part (Little Endian) | Low Part (Big Endian) | High Part (Big Endian) |
|---|---|---|---|---|
| 000 | 0 | 5 | 4 | 7 |
| 001 | 1 | 6 | 3 | 6 |
| 010 | 2 | 7 | 2 | 5 |
| 011 | 3 | 0 | 1 | 4 |
| 100 | 4 | 1 | 0 | 3 |
| 101 | 5 | 2 | 7 | 2 |
| 110 | 6 | 3 | 6 | 1 |
| 111 | 7 | 4 | 5 | 0 |

Figure 14:
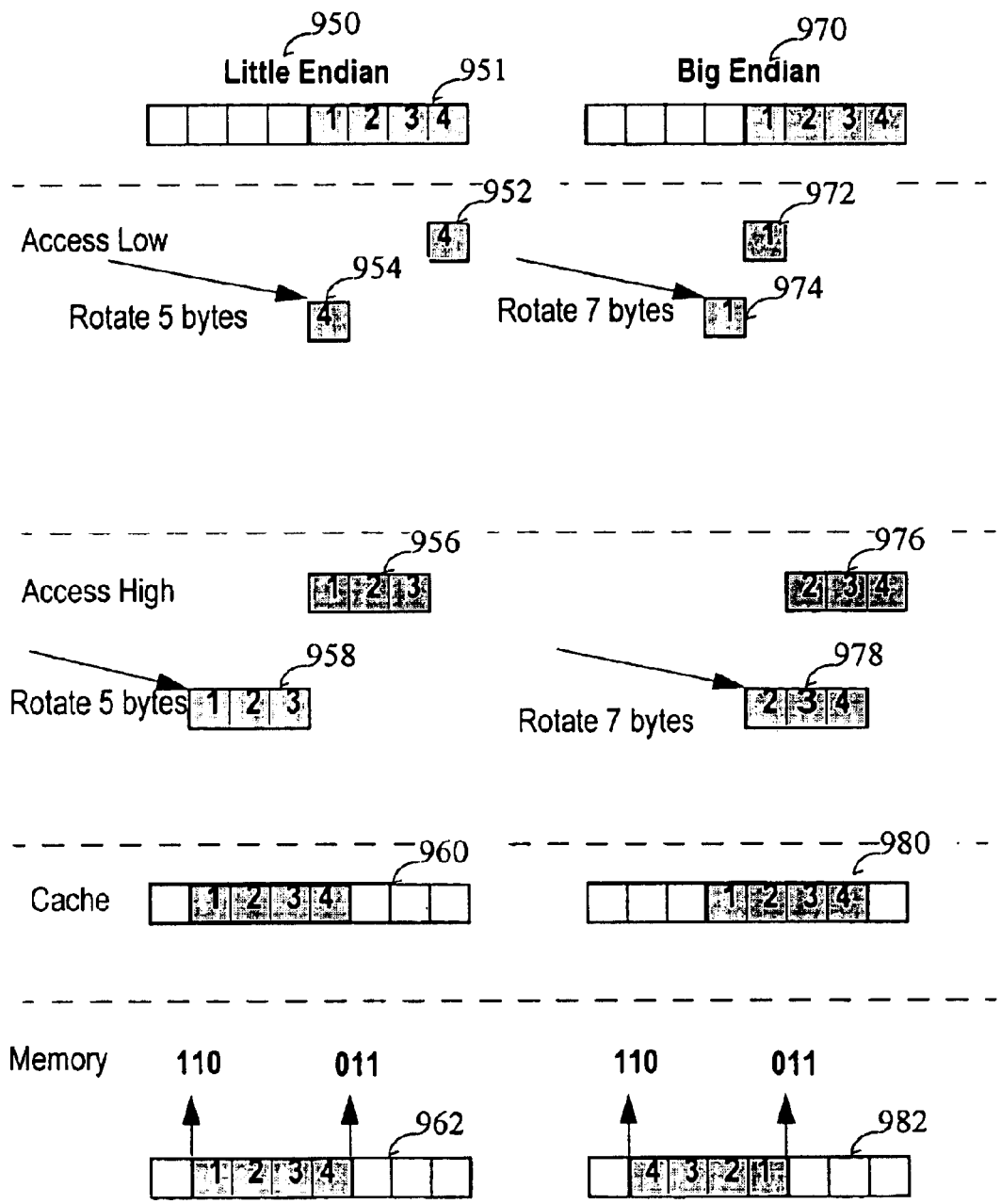
FIG. 14 shows an example of alignment of a 4-byte unaligned store instruction in different Endianness.

FIG. 14 shows an example of alignment of a 4-byte unaligned store instruction in different Endianness. The 4 bytes of data (1,2,3,4) are shown in register 951. In Little Endian order 950, the low part of data (4) 952 rotates 5 toward the right 954 and the high part (1,2,3) rotates 5 toward the right. Then with the introduction of the byte enable signal lsp_dbsel_ex3 the valid data is kept, i.e., written to cache 960 and to memory 962 at addresses 110 downto 011. In the Big Endian order 970, the low part rotates 7 toward the right 974 and the high part rotates 7 toward the right 978, then the lsp_dbsel_ex3 allows storage of the valid data. The detailed rotate distances of different Endianness for 8-byte, 4-byte stores are shown in Table 9 and Table 10.

TABLE 9

Right rotate distance for unaligned 8-byte store instruction

| lsp_addr_ex2 [2:0] (In Memory) | Low Part (Little Endian) | High Part (Little Endian) | Low Part (Big Endian) | High Part (Big Endian) |
|---|---|---|---|---|
| 000 | 0 | 7 | 0 | 1 |
| 001 | 7 | 6 | 1 | 2 |
| 010 | 6 | 5 | 2 | 3 |
| 011 | 5 | 4 | 3 | 4 |
| 100 | 4 | 3 | 4 | 5 |
| 101 | 3 | 2 | 5 | 6 |
| 110 | 2 | 1 | 6 | 7 |
| 111 | 1 | 0 | 7 | 0 |

TABLE 10

Right rotate distance for unaligned 4-byte store instruction

| lsp_addr_ex2 [2:0] (In Memory) | Low Part (Little Endian) | High Part (Little Endian) | Low Part (Big Endian) | High Part (Big Endian) |
|---|---|---|---|---|
| 000 | 0 | 3 | 4 | 1 |
| 001 | 7 | 2 | 5 | 2 |
| 010 | 6 | 1 | 6 | 3 |
| 011 | 5 | 0 | 7 | 4 |
| 100 | 4 | 7 | 0 | 5 |
| 101 | 3 | 6 | 1 | 6 |
| 110 | 2 | 5 | 2 | 7 |
| 111 | 1 | 4 | 3 | 0 |

The byte selection for 4-byte, 2-byte, and 1-byte store instructions are in Table 11, Table 12, and Table 13 below.

TABLE 11

Byte selection for 4-byte store instruction

| lsp_addr_ex2 [2:0] (In Memory) | Low Part (Little Endian) | High Part (Little Endian) | Low Part (Big Endian) | High Part (Big Endian) |
|---|---|---|---|---|
| 000 | 00001111 | 00000001 | 11110000 | 10000000 |
| 001 | 00001110 | 00000011 | 01110000 | 11000000 |
| 010 | 00001100 | 00000111 | 00110000 | 11100000 |
| 011 | 00001000 | 00001111 | 00010000 | 11110000 |
| 100 | 11110000 | 00010000 | 00001111 | 00001000 |
| 101 | 11100000 | 00110000 | 00000111 | 00001100 |
| 110 | 11000000 | 01110000 | 00000011 | 00001110 |
| 111 | 10000000 | 11110000 | 00000001 | 00001111 |

TABLE 12

Byte selection for 2-byte store instruction

| lsp_addr_ex2 [2:0] (In Memory) | Little Endian | Big Endian |
|---|---|---|
| 000 | 00000011 | 11000000 |
| 010 | 00001100 | 00110000 |
| 100 | 00110000 | 00001100 |
| 110 | 11000000 | 00000011 |

TABLE 13

Byte selection for 1-byte store instruction

| lsp_addr_ex2 [2:0] (In Memory) | Little Endian | Big Endian |
|---|---|---|
| 000 | 00000001 | 10000000 |
| 001 | 00000010 | 01000000 |
| 010 | 00000100 | 00100000 |
| 011 | 00001000 | 00010000 |
| 100 | 00010000 | 00001000 |
| 101 | 00100000 | 00000100 |
| 110 | 01000000 | 00000010 |
| 111 | 10000000 | 00000001 |

In a specific embodiment sign extension or zero extension is the step following the byte-rotating operation for the load instruction. There is no need to do the extension for store instructions because the store width is based on the instruction instead of the 8-byte width. The mask signal is for masking valid bytes of unaligned data with load instruction, then the size is used to determine if the result in a given byte position is taken from sign/zero extension or from the rotated output. These signals are used to select the inputs of mux of producing the lsu_result_ex3. A unaligned 4-byte load which produces the lower order bytes (LDLO in little Endian mode and LDHI in big Endian) always zero extends. For unaligned 4-byte store, the sign bit is located at the offset address of the load-high instruction for Little Endian and at the offset address of the load-low instruction for Big Endian.

Figure 15:
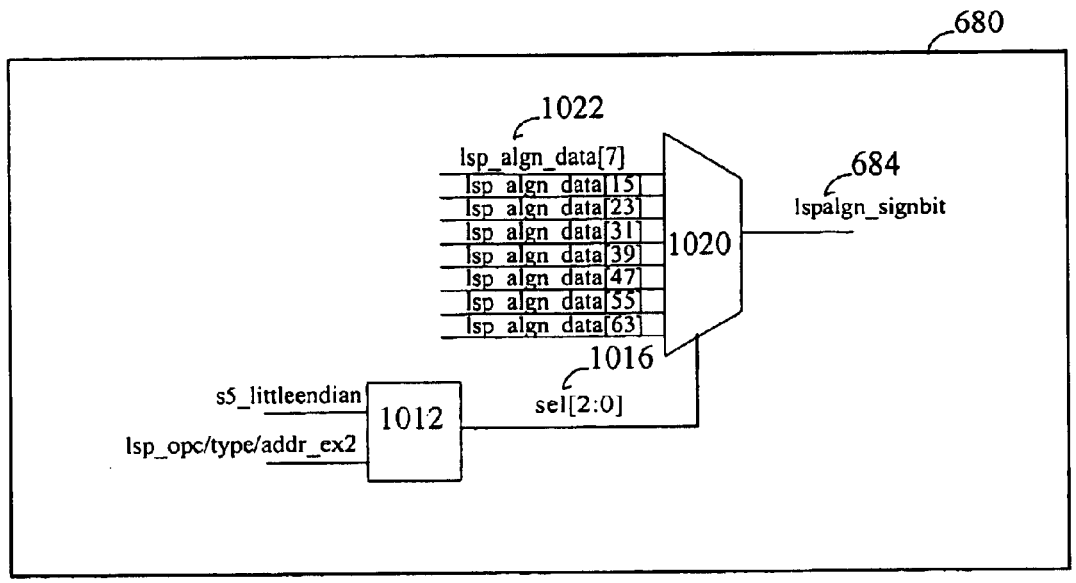
FIG. 15 illustrates a simplified block diagram of the Sign selection block 680 of the present invention.

FIG. 15 illustrates a simplified block diagram of the Sign Selection block 680 of the present invention. FIG. 15 shows how the lspalgn_signbit 684 is determined from the operation, address and endianness in a specific embodiment. The inputs to block 1012 generate a select signal, sel[2:0], 1016 which controls a 8-to-1 mux 1020 on the signbits (63, 55, 47, 39, 31, 23, 15, 7) from the input word, lspalgn_data. Note if the result type is unsigned, a signbit 684 of 0 is returned.

Figure 16:
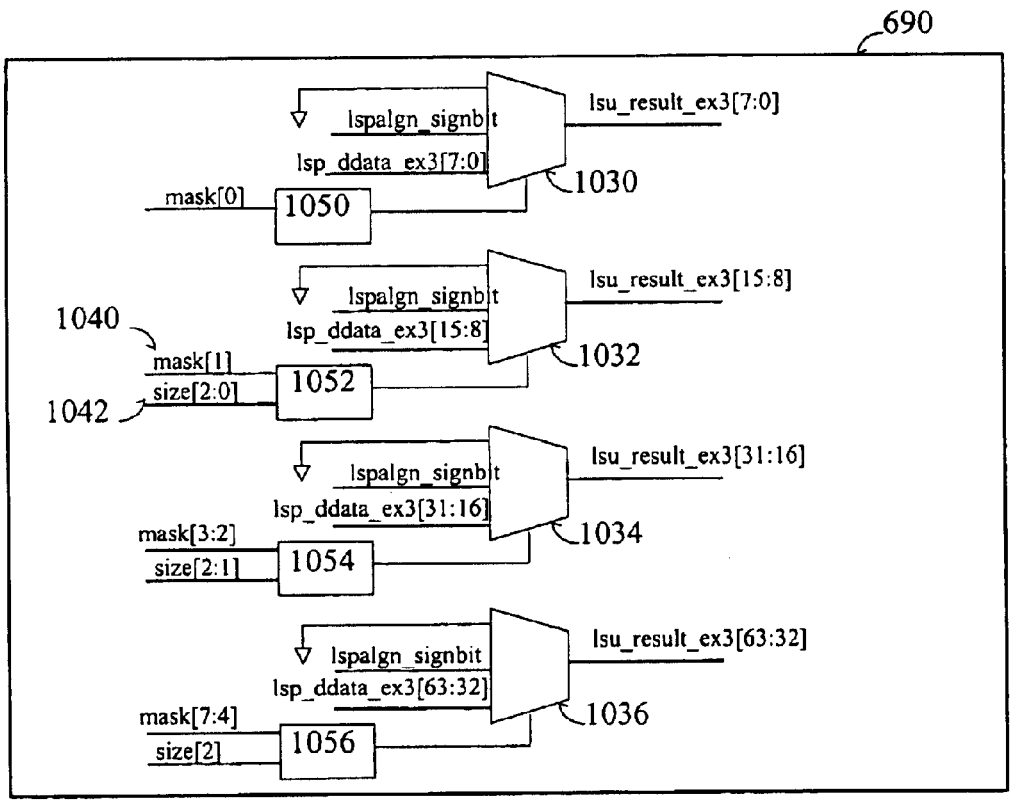
FIG. 16 illustrates a simplified block diagram of the Sign (zero) Extension Block 690 of the present invention.

FIG. 16 illustrates a simplified block diagram of the Sign (zero) Extension Block 690 of the present invention. FIG. 16 shows how each byte in the output is selected in a mux (1030, 1032, 1034, 1036) from "0" 688, rotate output 686 or signbit 684, depending on the size, e.g. size[2:0] 1042, the mask (for unaligned loads), e.g., mask[1] 1040, and opcode (the signal lsp_opc_ex3, although not shown is an input to each control block 1040, 1042, 1044, and 1046). The size array is an encoding:

'define LSU_SIZE_8 3'b111
'define LSU_SIZE_4 3'b011
'define LSU_SIZE_2 3'b001
'define LSU_SIZE_1 3'b000 where LSU_SIZE_n is the encoding of data of size n bytes. The mask is used to mask the rotate output 686 (on a per byte basis), so that for unaligned loads, bytes below the lowest byte read are masked to "0". This masking is merged in the same step as the sign/zero extension 690.

Conclusion

In the foregoing specification, the invention has been described with reference to specific exemplary embodiments thereof. Other embodiments will be apparent to those of ordinary skill in the art. For example, the instructions may be 16 or 64 bits in length and the microprocessor may operate with 8, 16, 32, or 128 bit busses and words. Thus it is evident that various modifications and changes may be made thereunto without departing from the broader spirit and scope of the invention as set forth in the appended claims and their full scope of equivalents.

What is claimed is:

1. A method for accessing a datum stored in a memory comprising:

accessing the memory to read out a first portion of the datum, the first portion comprising one or more first bytes;

performing a first rotation operation on the first bytes to produce rotated first bytes, wherein a rotate distance of the first rotation operation is based on whether the datum stored in the memory is stored in Big Endian order or in Little Endian order;

replacing portions of the rotated first bytes with binary zeroes to produce aligned first bytes;

storing the aligned first bytes to a first data store;

accessing the memory to read out a second portion of the datum, the second portion comprising one or more second bytes;

performing a second rotation operation on the second bytes to produce rotated second bytes, wherein a rotate distance of the second rotation operation is based on whether the datum stored in the memory is stored in Big Endian order or in Little Endian order;

replacing portions of the rotated second bytes with binary zeroes to produce aligned second bytes;

storing the aligned second bytes to a second data store; and performing an OR operation of the content of the first data store and the second data store to produce the datum.

2. The method of claim 1 wherein the datum as stored in the memory can be an aligned datum or an unaligned datum.

3. The method of claim 1 wherein the step of replacing portions of the rotated first bytes with binary zeroes includes performing a masking operation.

4. The method of claim 3 wherein the step of replacing portions of the rotated second bytes with binary zeroes includes performing a sign extension operation.

5. The method of claim 1 wherein the datum is one of a 16-bit datum, a 32-bit datum, and a 64-bit datum.

6. The method of claim 1 further comprising storing the datum to a third data store subsequent to performing the OR operation.

7. A CPU having a circuit configured to access a datum stored in a memory comprising:

a data input for receiving a portion of the datum from the memory;

a rotator circuit coupled to the data input and having a rotator output, the rotator circuit configured to perform a rotation operation of data on the input and to produce rotated data at the output;

a distance control circuit having a control signal coupled to the rotator circuit, wherein the control signal is dependent on whether the datum that is stored in the memory is stored in Big Endian order or in Little Endian order, wherein an amount of rotation performed by the rotator circuit is dependent on the control signal; and a zero-filling circuit coupled to the rotator output and configured to replace one or more bit positions of a datum on the rotator output with binary zeroes.

8. The circuit of claim 7 wherein the datum stored in the memory can be an aligned datum or an unaligned datum.

9. The circuit of claim 7 wherein the datum stored in the memory comprises a first portion of one or more bytes of data and a second portion of one or more bytes of data, wherein the first portion is processed by the circuit to produce a first result and the second portion is processed by the circuit to produce a second result, wherein an OR operation performed on the first result and the second result produces the datum stored in the memory.

10. A data processor system comprising:
   a memory, wherein a first datum is stored in the memory, wherein the first datum can be an aligned datum or an unaligned datum;
   a data input for receiving a portion of the first datum from the memory;
   a rotator circuit coupled to the data input and having a rotator output, the rotator circuit configured to perform a rotation operation of data on the input and to produce rotated data at the output;
   a distance control circuit having a control signal coupled to the rotator circuit, wherein the control signal is dependent on whether the first datum is stored in the memory in Big Endian order or in Little Endian order, wherein an amount of rotation performed by the rotator circuit is dependent on the control signal; and
   a zero-filling circuit coupled to the rotator output and configured to replace one or more bit positions of a datum on the rotator output with binary zeroes.

11. The data processor system of claim 10 wherein the datum stored in the memory comprises a first portion of one or more bytes of data and a second portion of one or more bytes of data, wherein the first portion is processed by the circuit to produce a first result and the second portion is processed by the circuit to produce a second result, wherein an OR operation performed on the first result and the second result produces the datum stored in the memory.

* * * * *